(12) United States Patent
Twigg

(10) Patent No.: US 7,100,221 B1
(45) Date of Patent: *Sep. 5, 2006

(54) KOT-TO-TROT

(75) Inventor: Christopher J. Twigg, Melbourne, FL (US)

(73) Assignee: Broadfield Imaging Corp., Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/809,612

(22) Filed: Mar. 25, 2004

Related U.S. Application Data

(63) Continuation-in-part of application No. 10/677,828, filed on Oct. 2, 2003, now Pat. No. 6,925,664.

(60) Provisional application No. 60/415,885, filed on Oct. 3, 2002.

(51) Int. Cl.
  *A45F 1/16* (2006.01)
(52) U.S. Cl. .................... 5/113; 5/110; 5/112
(58) Field of Classification Search ............ 5/112–113, 5/115, 110; 135/90, 128, 131
  See application file for complete search history.

(56) References Cited

U.S. PATENT DOCUMENTS

| | | | |
|---|---|---|---|
| 648,219 A | 4/1900 | Rupp | |
| 829,589 A | 8/1906 | Leavitt | |
| 1,366,482 A | 1/1921 | Osterud | |
| 1,820,284 A | 8/1931 | Mills | |
| 1,858,254 A | 5/1932 | Uline | |
| D127,808 S | 6/1941 | McGillicuddy | |
| 2,702,586 A | 2/1955 | Borgfeldt | |
| 3,848,279 A * | 11/1974 | Ipsen, Jr. .................... | 5/113 |
| D294,752 S | 3/1988 | Palier .................... | D30/118 |
| 4,846,204 A * | 7/1989 | Sok Kyu .................... | 5/113 |
| 5,072,694 A | 12/1991 | Haynes et al. .................... | 119/19 |
| 6,167,898 B1 * | 1/2001 | Larga et al. .................... | 135/137 |
| 6,644,329 B1 * | 11/2003 | Tomason .................... | 135/96 |

FOREIGN PATENT DOCUMENTS

WO PCT/AU03/00353 3/2003

OTHER PUBLICATIONS www.global sources.com/gsol/General Manager/&design, Zhejiang Ganghai Industrial Co. Ltd., GH2047 Lightweight Camping Bed Suitable for Outdoor Use, Copyright 2003, p. 1 and 2.

* cited by examiner

*Primary Examiner*—Suzanne Dino Barrett
*Assistant Examiner*—Fredrick Conley
(74) *Attorney, Agent, or Firm*—Brian S. Steinberger; Law Offices of Brian S. Steinberger, P.A.

(57) ABSTRACT

Collapsible lightweight, and portable cot type bed for pets and children. A spring biased horizontal connector pin can slidably attach bottom edges of vertical support legs to horizontal cross braces to maintain the cot in an assembled position that can support extreme amounts of weight. The horizontal pin can be connected to a bottom portion of a metal strip having an upper edge attached by rivets, soldering or welding to the vertical support legs. Sidewall panels along the planar support surface of the cot allow for keeping objects from sliding off the cot. A removable canopy or a removable hutch-like compartment for deflecting sun and providing shade when the cot is used outdoors can be mounted to the vertical legs above the planar support surface. The hutch-like compartment is made of flexible, lightweight materials and can be closed on all sides, using see-through or open weave materials for ventilation while securely containing a child or pet inside. The cot can be easily folded like an accordion and placed in a carrying bag and have a weight of less than approximately 15 pounds.

21 Claims, 28 Drawing Sheets

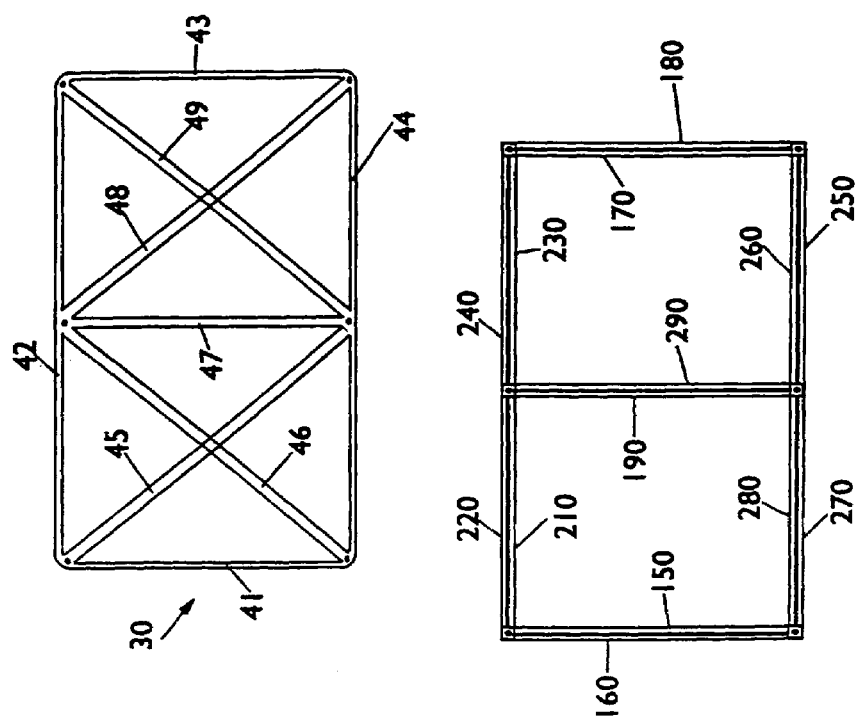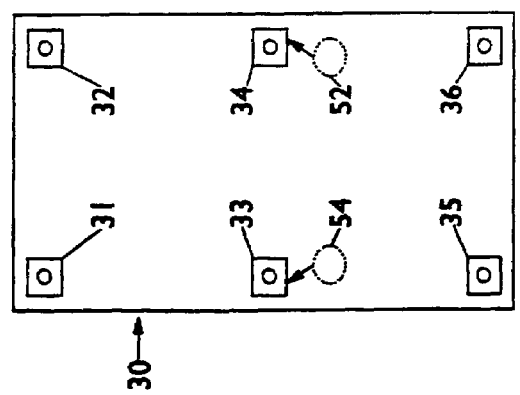

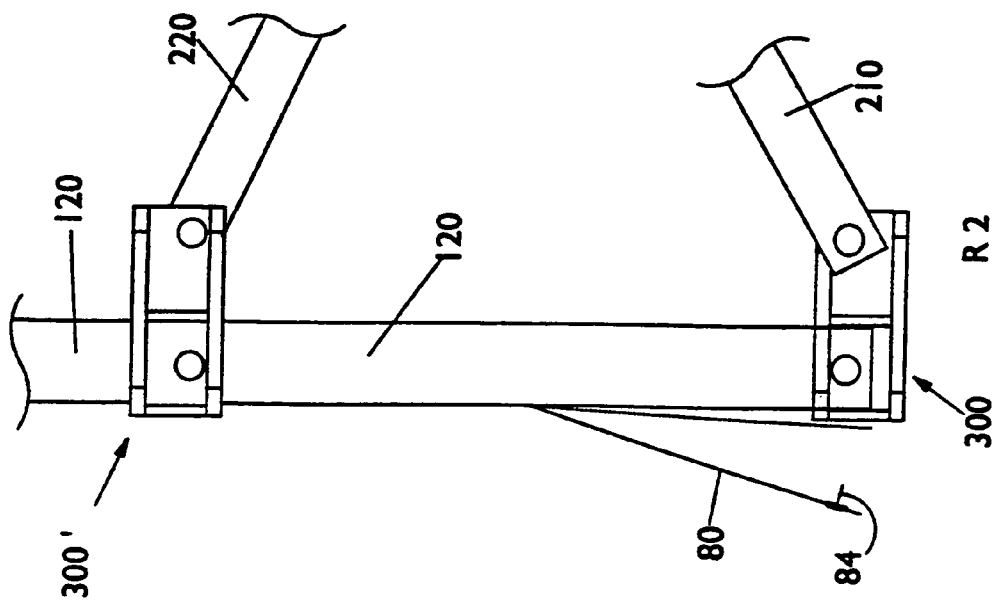
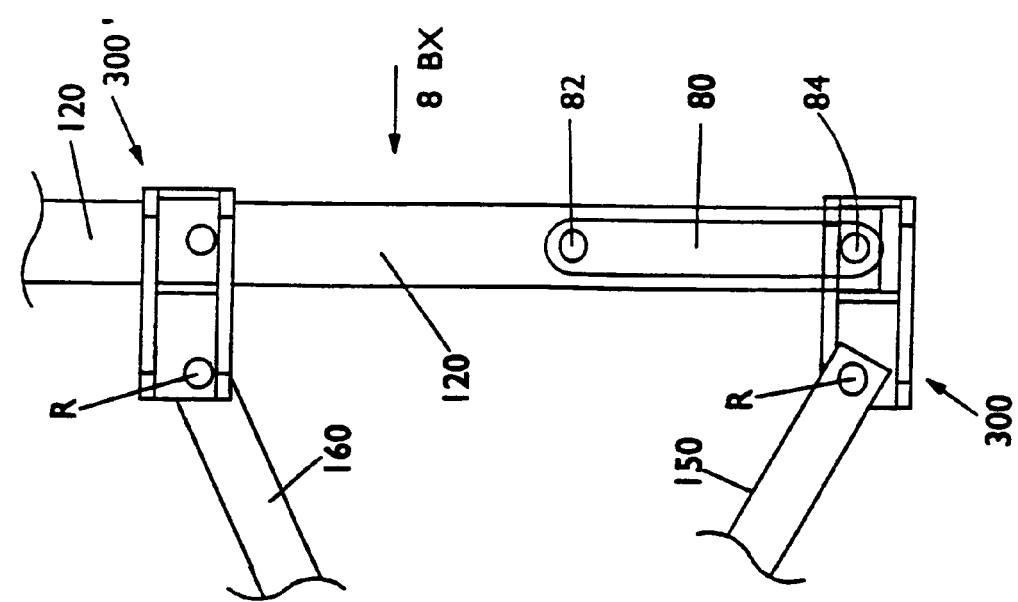

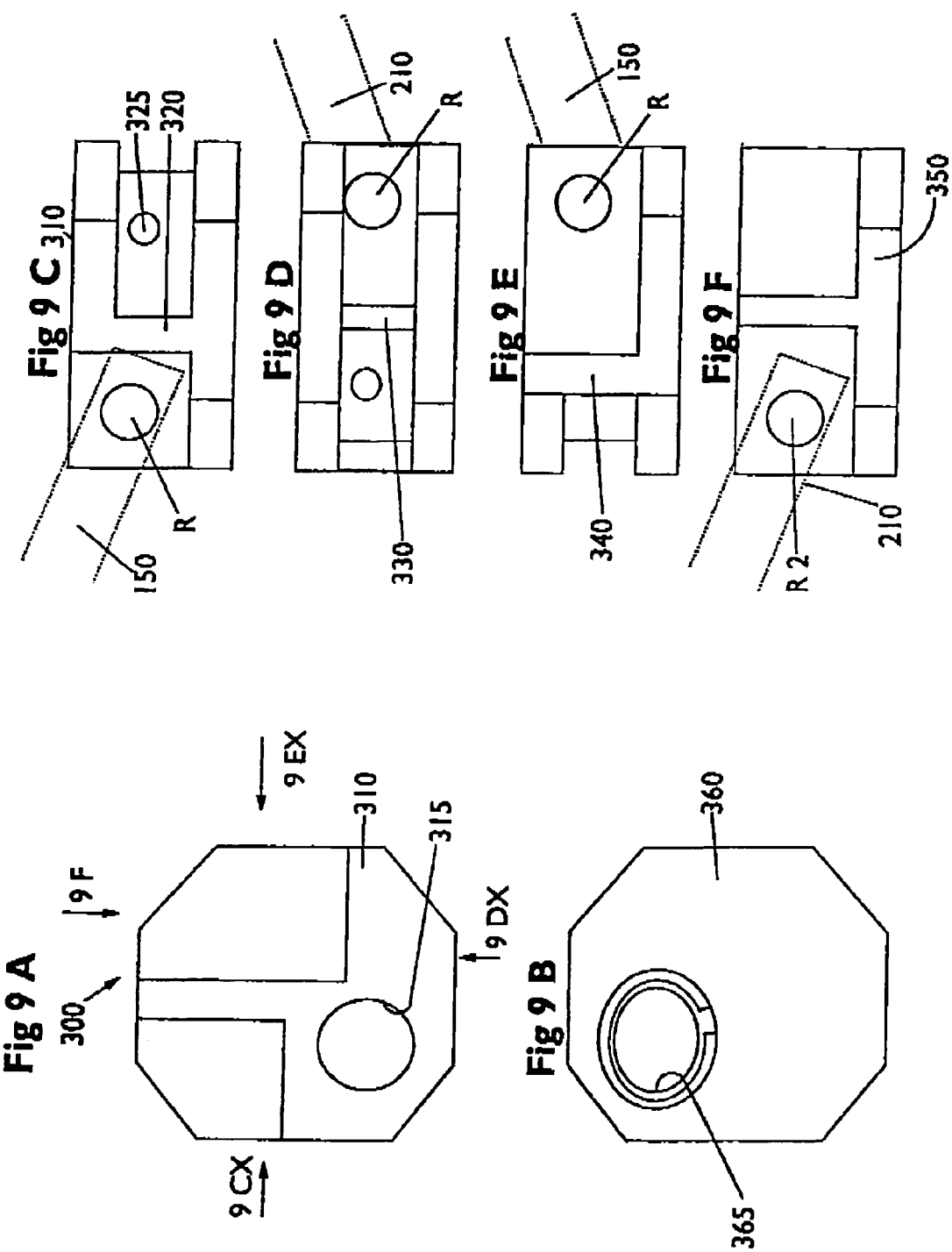

KOT-TO-TROT

This invention is a Continuation-In-Part of U.S. Pending application Ser. No. 10/677,828 filed Oct. 2, 2003 now U.S. Pat. No. 6,925,664, which claims priority from U.S. Provisional Application No. 60/415,885 filed Oct. 3, 2002.

FIELD OF INVENTION

This invention relates to beds and cots, and in particular to portable, collapsible, lightweight cots and beds, with or without a canopy, with or without a hutch-like enclosure, and portable, collapsible and lightweight steps that can be used for pets, and children.

BACKGROUND AND PRIOR ART

Pets and small animals usually sleep directly on the floor. Often a piece of carpet, blanket, or pad has been used. However, the pets and animals are still lying on the floor, and are subject to undesirable effects such as bugs and insects, and lying on a hard uncomfortable surface.

Various types of beds and cots, and the like, have been proposed over the years that are primarily used for people. See for example, U.S. Pat. No. 829,589 to Leavitt; U.S. Pat. No. 1,366,482 to Osterud; U.S. Pat. No. 1,858,254 to Uline; and U.S. Pat. No. 4,846,204 to Sok KyuRecently, an international patent application, PCT/AU03/00353 to Bedington discloses a bed for pets and a website, www.globalsources.com/gsol/General Manager/& design, shows a "Lightweight Camping Bed Suitable for Outdoor Use," item no. GH2047, manufactured by Zhejiang Ganghai Industrial Co. Ltd., China, copyright 2003.

However, none of the prior art devices have a locking mechanism to keep the legs in place when fully assembled, nor do they have sidewall panels for keeping animated objects confined on the surface. Furthermore, none of these devices combine sidewalls with any type of shade and protective covers such as canopies or hutch-like compartments for covering the occupants. None of these devices appear to be easily collapsible and portable, yet stable and strong enough to be used as a step to assist climbing to higher elevations. Finally, none of these devices appear to be easily collapsible and portable so as to be carried by a single person. The prior art devices would have problems supporting large weights that can come with large pets since these beds/cots would tend to collapse under large weights of up to 150 pounds or more.

Several patented devices have been proposed as beds/cots for pets. See for example, U.S. Pat. No. 1,820,284 to Mills; Des. 127,808 to McGillicuddy; Des. 294,752 to Palier; and U.S. Pat. No. 5,072,694 to Haynes et al. However, these patents again do not solve all the problems with the other devices described above. For example, these pet devices do not have locking mechanisms to keep the legs in place when fully assembled, and are also not easily collapsible and portable. Furthermore, these pet devices would not be able to support large animals of up to approximately 150 pounds or more.

Thus, the need exists for solutions to the above problems with the prior art.

SUMMARY OF THE INVENTION

A primary objective of the present invention is to provide a collapsible and portable cot and bed for pets.

A secondary objective of the present invention is to provide a collapsible and portable cot that can be used for children.

A third objective of the present invention is to provide a collapsible and portable cot and bed that can be used indoors and outdoors.

A fourth objective of this invention is to provide a collapsible and portable cot and bed having connectors for locking legs to side support struts that can handle weights of up to approximately 150 pounds or more while remaining sturdy and stable.

A fifth objective of the present invention is to provide a collapsible and portable cot and bed having sidewalls along up to three sides of the cot surface for keeping occupants from easily falling off the cot.

A sixth objective of the present invention is to provide a collapsible and portable cot and bed having a removable canopy for providing shade and a protective cover.

A seventh objective of the present invention is to provide a collapsible and portable cot and bed having a combination of a sidewall along with a canopy cover.

An eighth objective of the present invention is to provide a collapsible and portable lightweight platform that can be used as a step or a series of steps, in a modular configuration, to enable a pet or child to reach higher elevations.

A ninth objective of the present invention is to provide a collapsible and portable cot and bed having a secure hutch-like compartment for enclosing an object.

A tenth objective of the present invention is to provide a collapsible and portable cot and bed that can be closed securely and is well ventilated.

A preferred embodiment of the portable and collapsible cot includes a flexible planar surface layer and leg members for both cross-bracing and supporting the planar surface layer over a ground surface, the leg members being moveable between an assembled position and a folded position, where the assembled position fully supports weighted objects being placed on the planar surface layer, and the folded position has the cot in a collapsed position allowing the cot to become portable and easy to carry.

The leg members can include a first set of rods pivotably attached to one another for supporting a left side end of the cot that are moveable between a substantially crossed position while the cot is in the assembled position to a substantially parallel position while the cot is in a folded position, and a second set of rods pivotably attached to one another for supporting a right side end of the cot opposite the left side end, that are moveable between a substantially crossed position while the cot is in the assembled position to a substantially parallel position while the cot is in the folded position. Additionally, a middle set of rods can be used for supporting a mid-portion of the cot located substantially midway between the left side end and the right side end, that are moveable between a substantially crossed position while the cot is in the assembled position to a substantially parallel position while the cot is in a folded position.

The leg members can further include vertical leg portions extending downward from each of the corners of the planar surface layer having an upper end that remains attached to each of the corners of the planar surface layer, and a bottom end which engages a corner footer when the cot is in the assembled position, and the bottom end disengages the corner footer when the cot is in the folded position.

Bendable-snapable members can be used for connecting the bottom ends of the vertical leg portions to the corner footers. The bendable-snapable members can be longitudinal clips having one end fixably attached to a portion of each of the vertical leg portions above the bottom end of the vertical leg portions, the clip having an opposite end with a protruding pin for mateably engaging an opening in the corner footer for locking the cot in the assembled position, the pin end of the clip being bendable away from the corner footer for allowing the cot to be folded.

The cot can further include a front pair of rods pivotably attached to one another for supporting a front side of the cot that are moveable between a substantially crossed position while the cot is in the assembled position to a substantially parallel position when the cot is in a folded position, and a rear pair of rods pivotably attached to one another for supporting a rear side of the cot opposite the front side, that are moveable between a substantially crossed position while the cot is in the assembled position to a substantially parallel position when the cot is in the folded position. Each of the front and rear rods can include two sets of pairs of the pivotable rods adjacent to one another that are moveable between substantially crossed positions while the cot is in the assembled position to the substantially parallel positions when the cot is in the folded position.

The flexible platform on the cot can include first straps along perimeter edges attached underneath the surface layer for enhancing strength of the surface layer to support the weighted object thereon, and second straps in a crossed pattern attached underneath the surface layer between the first straps attached to the perimeter edges.

A first embodiment of the cot has a removable canopy having ends that can be attached to the corner edges of the cot. The canopy can be attached by a first upside down U-shaped support attached to and extending upward from one side of the cot, and a second upside down U-shaped support attached to and extending upward from another side of the cot opposite the one side, wherein the first U-shaped support and the second U-shaped support hold the canopy in a fixed position above the cot. Approximately two hook and loop fastener straps (such as Velcro®) for each U-shaped support is used to stabilize the supports, and approximately four hook and loop fastener straps (such as Velcro@) can be used for attaching the back and/or sides of the canopy to the cot.

A second embodiment of the cot has a removable, hutch-like enclosure having ends that can be attached to the corner edges of the cot. The hutch-like enclosure can be attached by a first upside down U-shaped support attached to and extending upward from one side of the cot, and a second upside down U-shaped support attached to and extending upward from another side of the cot opposite the one side, wherein the first U-shaped support and the second U-shaped support are connected by a strap extending from one side of the cot to the opposite side at a point approximately midway of the top of each upside down U-shaped support. The upside down U-shaped supports and strap hold the hutch-like enclosure in a fixed position above the cot. Hook and loop fastener strips (such as Velcro@) are sewn along the edges of the sidewalls of the cot and matching hook and loop fastener strips (such as Velcro@) are sewn along the back and side bottom edges of the hutch-like enclosure so that when the hutch-like enclosure is in place above the cot, the matching strips can be used for attaching the back and/or sides of the hutch-like enclosure to the cot.

A third embodiment of the cot has flexible side walls attached to and extending upward from at least one perimeter edge from the surface layer, and can be used to keep objects on the surface layer from falling off the left, the right and rear side perimeter edges of the cot.

A fourth embodiment is a rectangular-shaped, lightweight and collapsible platform for use as a stair-step.

The length of the assembled cot can be up to approximately 46 inches long and a width of the assembled cot being approximately 24 inches wide, and have an overall weight of up to approximately 15 pounds.

A carrying bag having dimensions of up to approximately 30 inches by approximately 8 inches by approximately 8 inches for carrying a folded up version of the cot inside the bag so that a child can carry the cot from place to place.

The novel cot, bed or platform step can be used for pets and small children up to approximately 150 pounds in size, and can be used indoors and outdoors as needed.

Further objects and advantages of this invention will be apparent from the following detailed description of the presently preferred embodiments, which are illustrated schematically in the accompanying drawings.

BRIEF DESCRIPTION OF THE FIGURES

FIG. 6A is a top view of the flexible platform of FIG. 2 along arrow 6AY.

FIG. 6B is a bottom view of the flexible platform of FIG. 2 along arrow 6BY.

FIG. 7 is a bottom view of the assembled cot of FIG. 2 along arrow 7Y.

FIG. 8A is an enlarged view of the left front vertical corner leg of FIG. 4.

FIG. 8B is a front view of the left front corner leg of FIG. 8A along arrow 8BX.

FIG. 9A is an enlarged top view of one of an outer corner fitting footer used with the vertical corner legs of the cot.

FIG. 9B is a bottom view of the corner fitting footer of FIG. 9A.

FIG. 9C is a side view of the corner fitting footer of FIG. 9A along arrow 9CX.

FIG. 9D is a side view of the corner fitting footer of FIG. 9A along arrow 9DX.

FIG. 9E is a side view of the corner fitting footer of FIG. 9A along arrow 9EX.

FIG. 9F is a side view of the corner fitting footer of FIG. 9A along arrow 9FX.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

With regard to the terminology related to fasteners used in the present invention, it is to be understood that any conventional fasteners can be used, such as zippers, hooks, snaps, ties, adhesive strips and the like. One type of fastener referred to frequently herein is the hook and loop fastener marketed commercially as Velcro®, a nylon fabric that can be fastened to itself. It is readily available and convenient to use; however, it is not to be considered a limitation of the present invention.

Four distinct embodiments of the novel portable, collapsible cot or bed of the present invention are discussed in detail below. The first embodiment of the present invention has a removable canopy attached to the corner edges of the cot. The second embodiment of the present invention has a removable hutch-like enclosure and can be used as a well-ventilated compartment, pen or coop. The third embodiment has flexible sidewalls attached to and extending upward from at least one perimeter edge of the surface layer. The fourth embodiment of the present invention has a platform surface that is used as a stair step.

Figure 1:
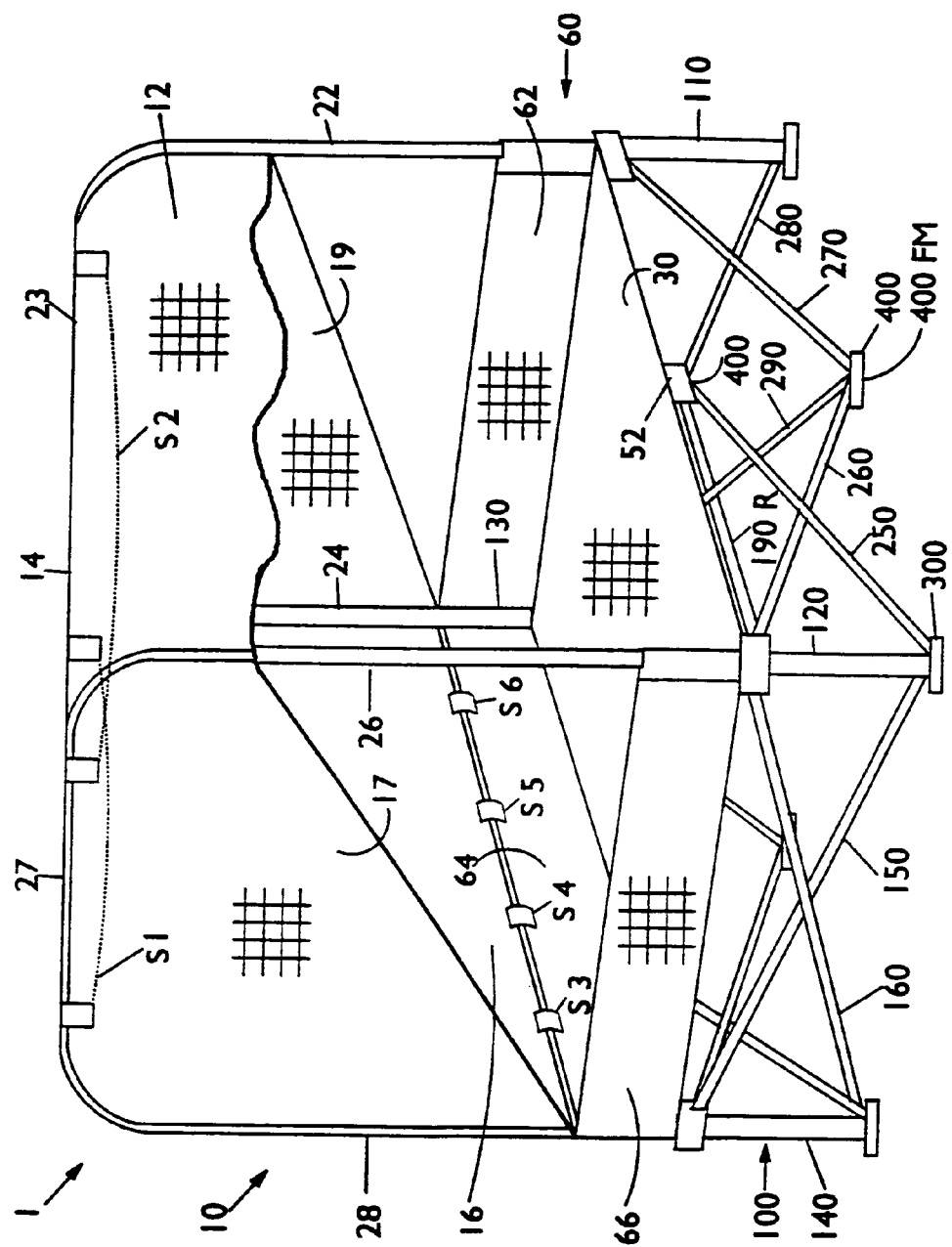
FIG. 1 is a perspective view of a first embodiment of the novel portable collapsible cot fully assembled with canopy cover.
Figure 2:
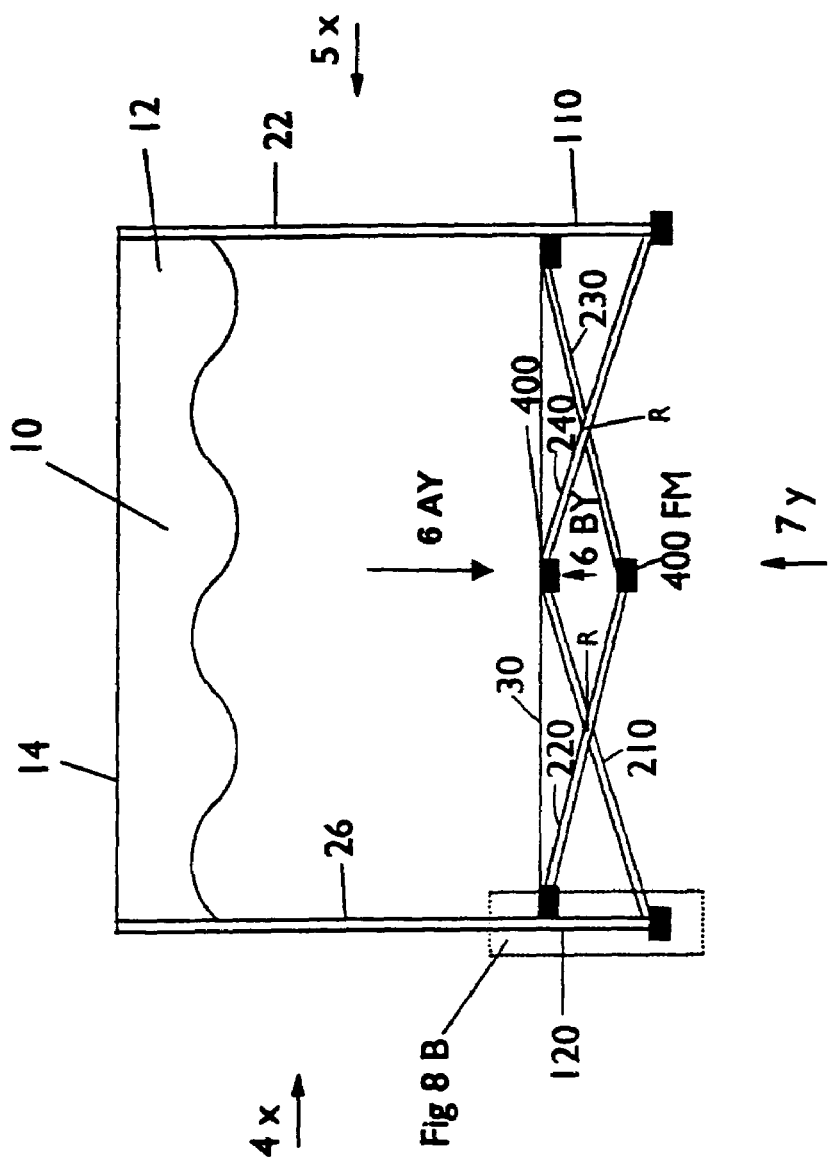
FIG. 2 is a front view of the cot of FIG. 1.
Figure 3:
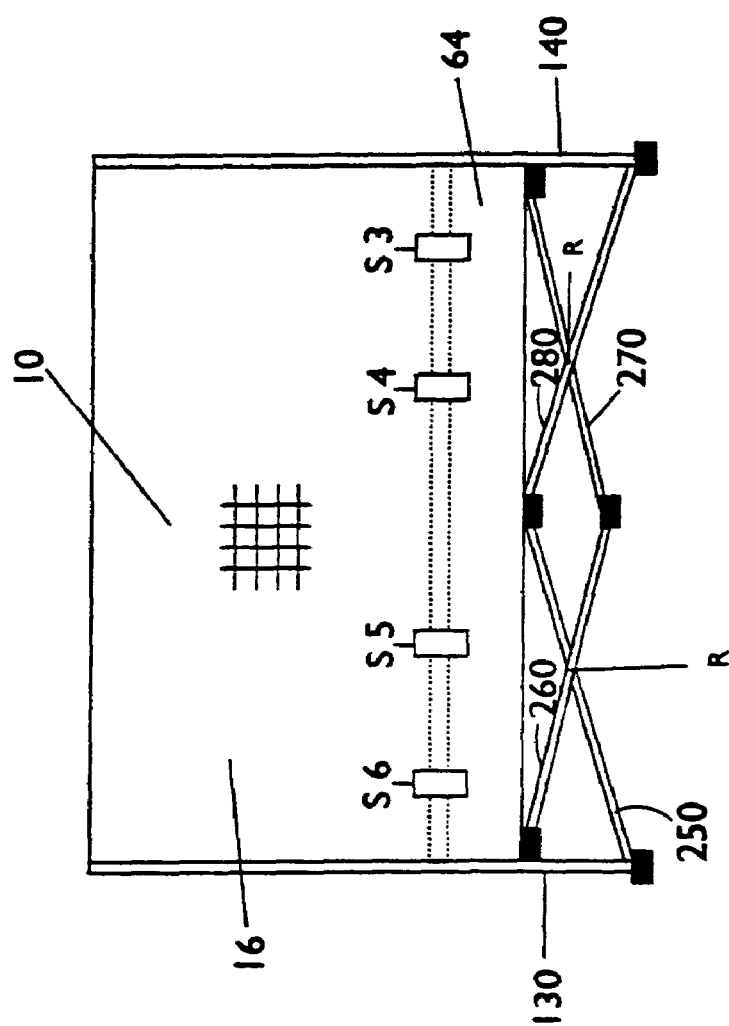
FIG. 3 is a rear view of the cot of FIG. 1.
Figure 5:
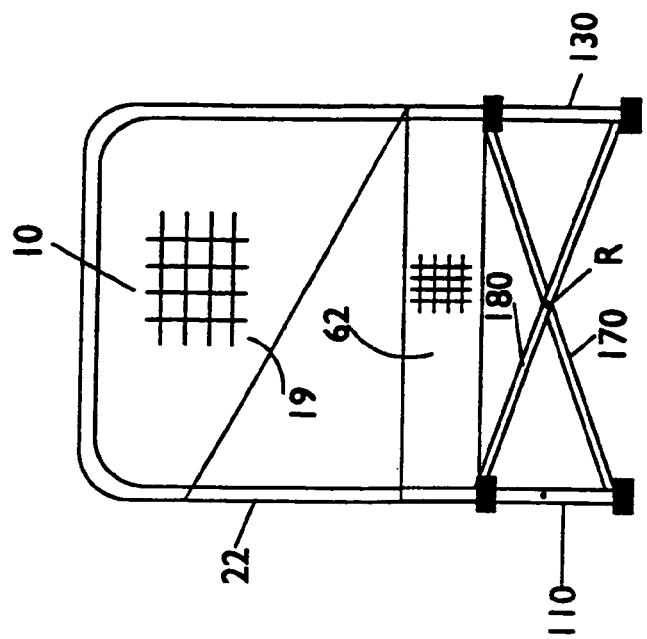
FIG. 5 is a right side view of the cot of FIG. 1 along arrow 5X.
Figure 4:
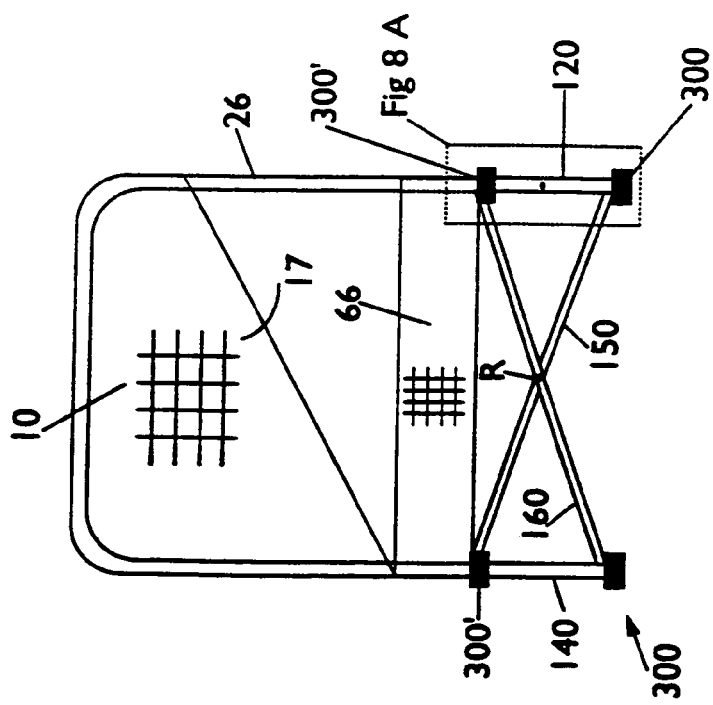
FIG. 4 is a left side view of the cot of FIG. 1 along arrow 4X.

FIG. 1 is a perspective view of a first embodiment of the novel portable collapsible cot 1 fully assembled with canopy cover 10. FIG. 2 is a front view of the cot 1 of FIG. 1. FIG. 3 is a rear view of the cot 1 of FIG. 1. FIG. 4 is a left side view of the cot 1 of FIG. 1 along arrow 4X. FIG. 5 is a right side view of the cot 1 of FIG. 1 along arrow 5X.

Figure 11:
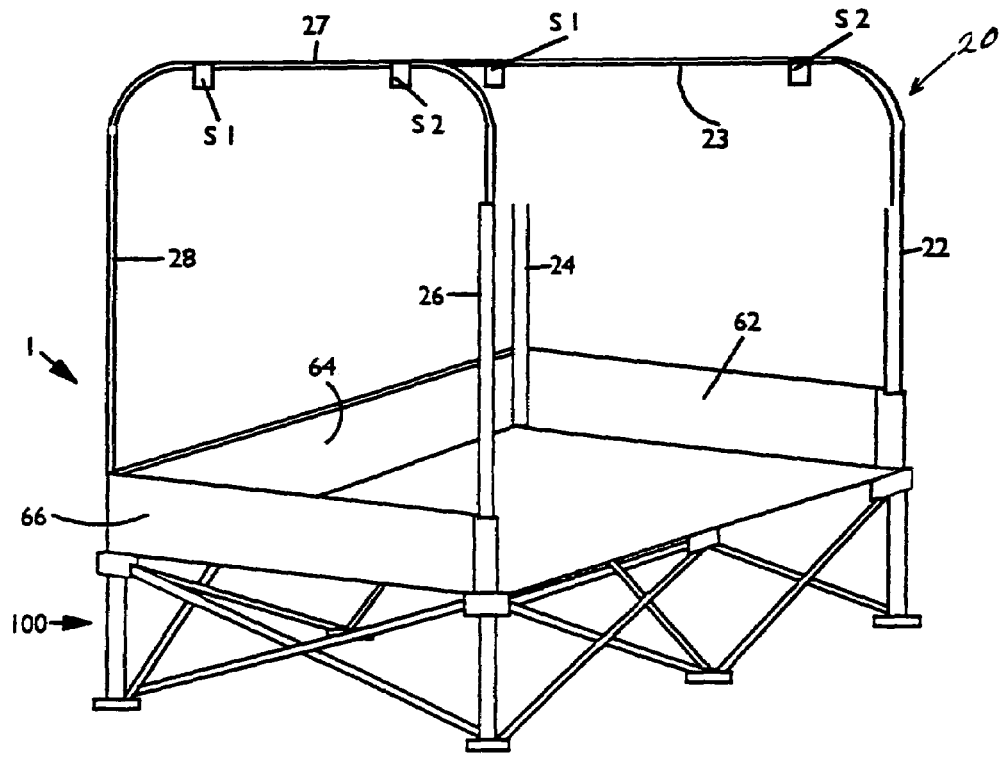
FIG. 11 is a perspective view of the assembled cot of FIG. 1 with the canopy removed.
Figure 12:
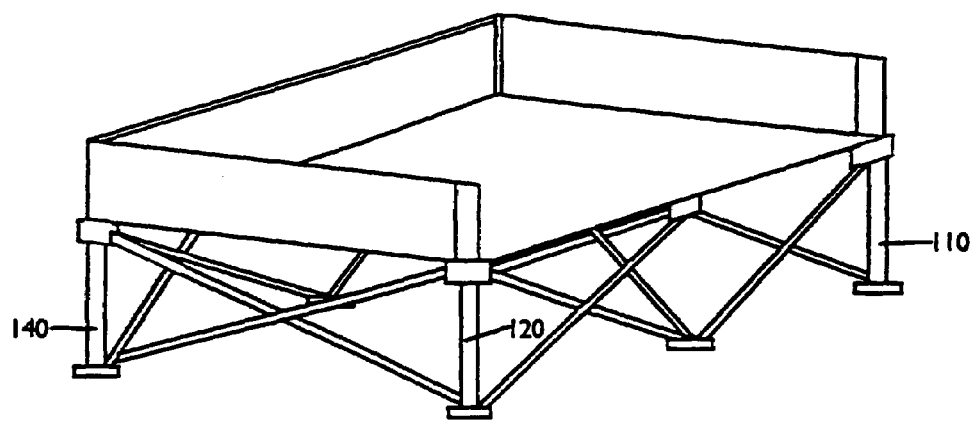
FIG. 12 is another view of the cot of FIG. 11 with the canopy support rods removed, the third embodiment of the present invention

Referring to FIGS. 1–5, cot 1 can include a canopy cover 10 formed from material such as but not limited to canvas, nylon, fabric, combinations thereof, and the like, having front upper hanging lip portion 12, upper roof portion 14, left side 17 and right side 19, and rear wall portion 16 that can be attached by upside down U-shaped rods 22, 23, 24, 26, 27, 28 that slide into the upper ends of vertical leg portions 110, 120, 130, 140 of the leg member section 100 (the latter of which is shown in FIGS. 11–12. Canopy 10 can be waterproof for protecting against weather elements such as rain, and the like, so that the cot can be placed outdoors. Canopy 10 can further function as a shade against the effects of the sun, and the like.

Cot 1 has a flexible planar surface 30 that can be formed from similar materials such as but not limited to canvas, nylon, fabric, combinations thereof, shown and described in more detail in reference to FIGS. 8A–8B.

Cot 1 can further include sidewalls 60, also used as a third embodiment of the invention, that can be formed from similar materials such as but not limited to canvas, nylon, fabric, combinations thereof. The preferred embodiment can include a right side wall 62, a rear side wall 64 and a left side wall 66, each having end edges that define channel openings for sliding over upper ends of the vertical leg portions 110, 120, 130, and 140. The side walls 60 can be formed by sewing double layers of material together and allowing an opening along the end edges to form the channel openings for attaching to the vertical leg portions 110, 120, 130, and 140. The left side wall 66, the right side wall 62, and the rear side wall 64 can keep objects such as but not limited to pets and small children that are on the surface layer 30 from falling off the left, the right and rear side perimeter edges of the cot 1.

The bottom of the cot 1 is supported by leg members 100 that include pivotably connected rods and vertical leg portions 110, 120, 130, 140 with corner and mid-section fittings and footers that can fold up like an accordion when not being used and extend outward to provide substantial support for objects placed on the cot 1.

In a fully assembled state as shown by FIGS. 1–5, the cot 1 has been tested to be able to support up to approximately 150 pounds with ease. The fully assembled cot 1 has dimensions of the planar support surface 30 being approximately 24 inches wide by approximately 46 inches long and can be supported approximately 10 inches above a ground surface, with the canopy cover being approximately 36 inches high above a ground surface. The total weight of the cot 1 with canopy 10 is approximately 15 pounds.

Additionally, approximately two hook and loop fastener straps (such as Velcro®) S1 and S2 can be used for each U-shaped support 22–24, 26–28 in order to stabilize the supports, and approximately four hook and loop fastener straps (such as Velcro®) S3, S4, S5, and S6 can be used for attaching the back and/or sides of the canopy 10 to the cot 1 can be used.

FIG. 6A is a top view of the flexible platform 30 of FIG. 2 along arrow 6AY. FIG. 6B is a bottom view of the flexible platform 30 of FIG. 2 along arrow 6BY. Referring to FIGS. 1, 2, 6A and 6B, flexible platform can be formed from similar materials as the canopy 10, such as but not limited to canvas, nylon, fabric, or combinations thereof. Upper surface of platform layer 30 can include extra materials 31, 32, 33, 34, 35, 36 of square shaped materials such as canvas, nylon, fabric, plastic, combinations thereof, that can be sewn to outer corners and mid-portion perimeter edges with metal eyelets for allowing the platform layer 30 to be supported by vertical legs 110, 120, 130, 140, and snapable mid-portion fastener buttons 52, 54. Underneath the flexible platform 30 can be a first group of straps 41, 42, 43, and 44 sewn along perimeter edges and across a mid-region 47 attached underneath the surface layer 30. A second group of straps 45, 46, 48, 49 can be sewn in a crossed pattern underneath the surface layer 30 between the first group of perimeter straps 41–44, 47. The straps 41–49 can be formed from canvas, nylon, fabric, plastic, combinations thereof, and be used for enhancing strength of the surface layer 30 in order to support weighted objects thereon.

FIG. 7 is a bottom view of the assembled cot of FIG. 2 along arrow 7Y.

Referring to FIGS. 2–5 and 7, the cot 1 can include various leg members that can each be formed from approximately ⅝ inch tubular steel. Cot 1 can include a pair of left side crossed legs 150, 160 that can be pivotably connected together at a mid-portion by a rivet R, and a pair of right side crossed legs 170, 180 that can be pivotably connected together at a mid-portion by a rivet R. Each of the pairs 150, 160 and 170, 180 are moveable between a substantially crossed position while the cot 1 is in the assembled position to a substantially parallel position when the cot 1 is in a folded position.

The cot 1 can include a front left pair of rods 210, 220 pivotably attached to one another by a rivet R, adjacent to a front right pair of rods 230, 240 pivotably attached to one another by a rivet R for supporting a front side of the cot 1. The two pairs of front pivotable rods 210, 220 and 230, 240 can be moveable between a substantially crossed position while the cot 1 is in the assembled position to a substantially parallel position when the cot 1 is in a folded position.

The cot 1 can include a rear left pair of rods 250, 260 pivotably attached to one another by a rivet R, adjacent to a rear right pair of rods 270, 280 pivotably attached to one another by a rivet R. The two pairs of rear pivotable rods 250, 260 and 270, 280 can be moveable between a substantially crossed position while the cot 1 is in the assembled position to a substantially parallel position when the cot 1 is in a folded position.

FIG. 8A is an enlarged view of the left front vertical corner leg 120 of FIG. 4. FIG. 8B is a front view of the left front corner leg 120 of FIG. 8A along arrow 8BX.

FIG. 9A is an enlarged top view of one of an outer corner fitting footer 300 used as a footer with the vertical corner legs 110, 120, 130, 140 of the cot 1. The footer 300 can be formed from injection molded plastic and the like. FIG. 9B is a bottom view 360 of the corner fitting footer 300 of FIG. 9A with throughhole 365. FIG. 9C is a side view 310 of the corner fitting footer 300 of FIG. 9A along arrow 9CX with a mateable opening 325 for receiving the pin 84 of bendable-snapable clip 80 (shown in FIGS. 8A–8B and 13C). FIG. 9D is a side view of the corner fitting footer 300 of FIG. 9A along arrow 9DX. FIG. 9E is a side view of the corner fitting footer 300 of FIG. 9A along arrow 9EX. FIG. 9F is a side view of the corner fitting footer 300 of FIG. 9A along arrow 9FX.

Referring to FIGS. 8A, 8B, 9A–9F and 13C, fittings 300 can be used as footers along all four corner perimeters for the cot 1. The fittings can also be used upside down and used as upper fittings 300' fixably attached to upper portions of the vertical leg portions 110, 120, 130, 140, respectively.

Figure 13:
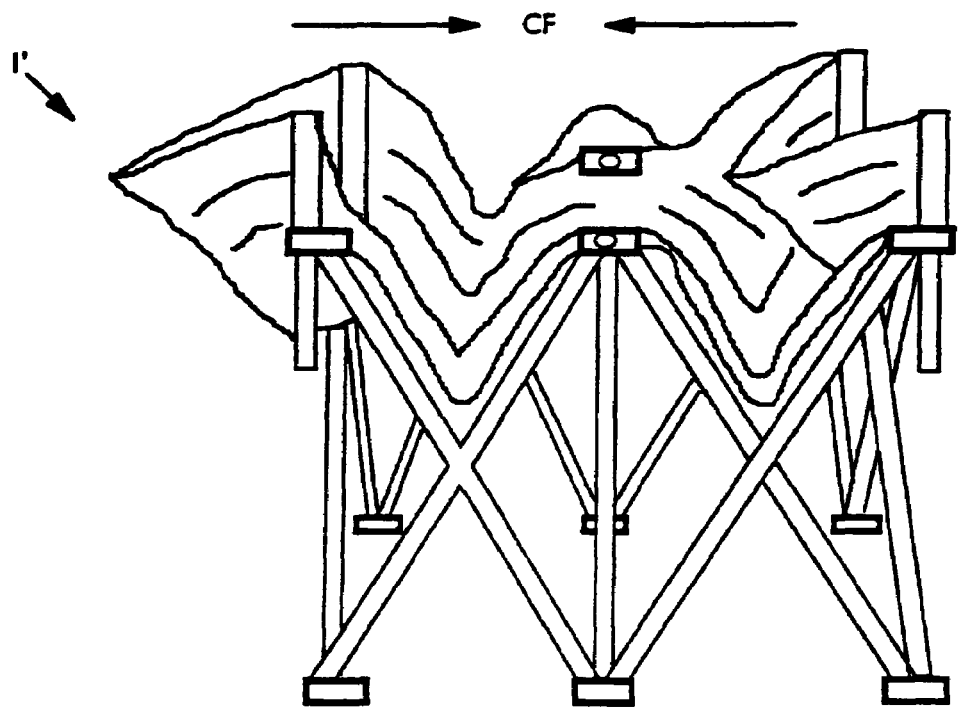
FIG. 13A is a perspective view of the cot of FIG. 12 in the process of being folded.
FIG. 13B is another view of FIG. 13A showing the cot being further folded together.
FIG. 13C is a left side view of FIG. 13B along arrow 13CX.
Figure 13:
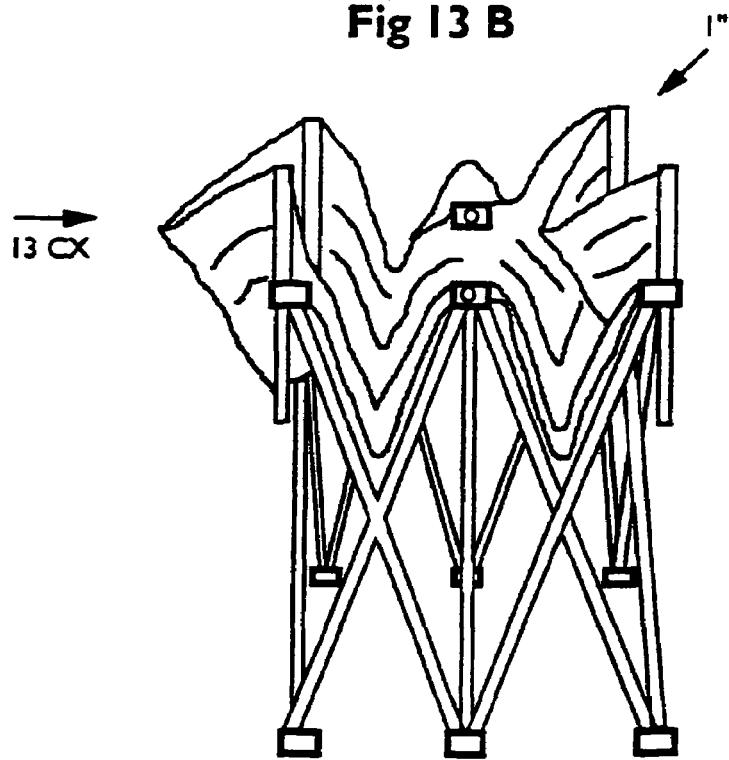
Figure 13:
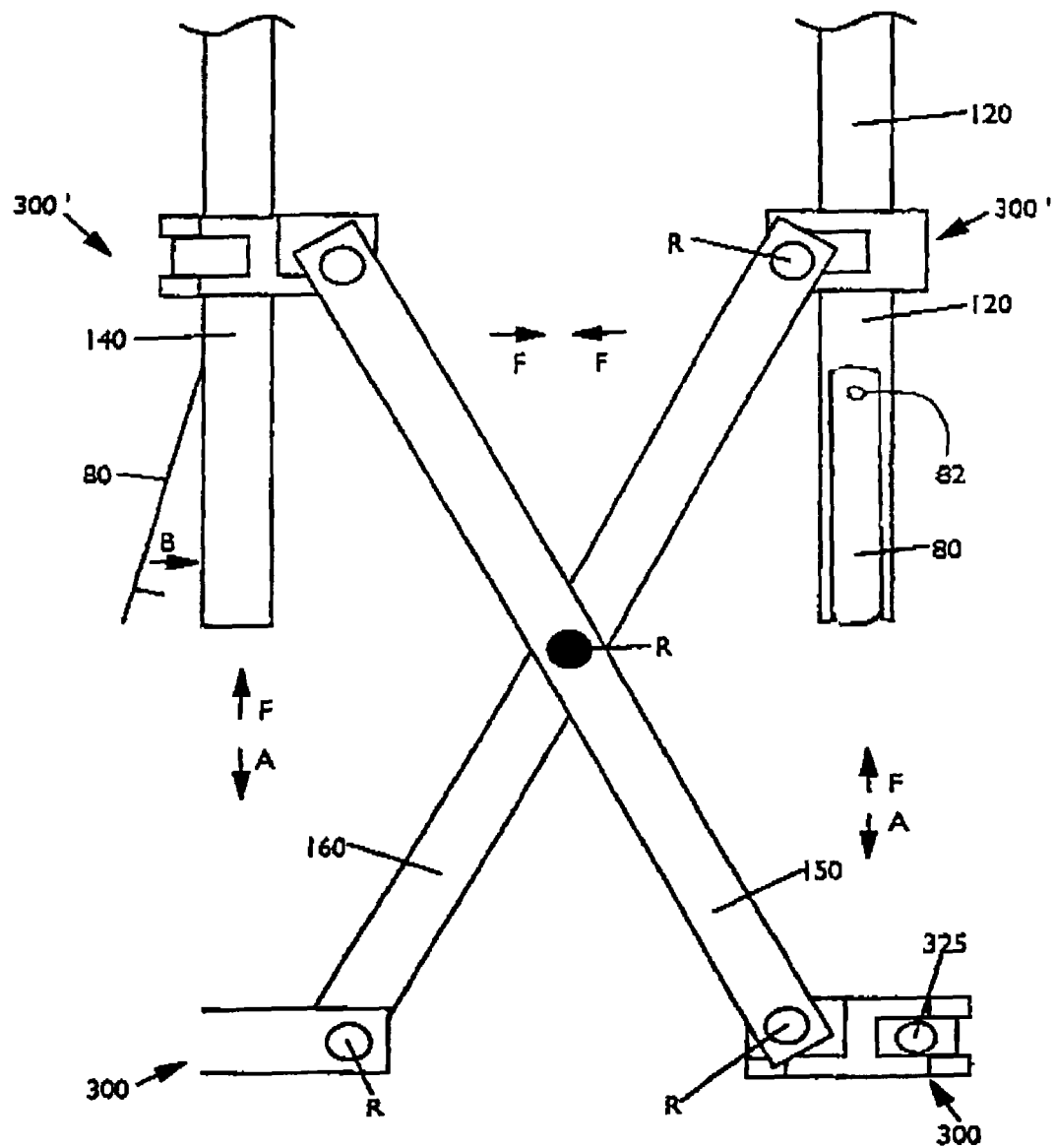

As shown by FIGS. 4, 8A–8B, 9A–9F and 13C, a footer 300 can be pivotably attached to a rod 150 by a rivet R, while another footer 300 is pivotably attached to another rod 160 by a rivet R. At the same time, the rods 150, 160 are pivotably attached to one another at a midportion by a rivet R. Upper ends of rods 150, 160 are also pivotably attached by rivets R to upper fittings 300' that are attached to vertical leg portions 140 and 120, respectively. Each of the vertical leg portions 110, 120, 130, 140 can have an elongated clip, such as a metal plate 80 having one end attached to the respective leg portion by a fixed rivet 82, and have a lower end which extends below the bottom end of each respective vertical leg portion (see 80, 84 and 120 of FIG. 13C). The clip 80 is made to be biased so as to tend to lay against the vertical leg portion in the direction of arrow B (FIG. 13C).

To lock the vertical leg portions in place, a user can bend the bottom of clip 80 back and lower the vertical leg portion in the direction of arrow A to pass into opening 315 of the footer 300 and then allow the pin 84 of the clip to pass into opening 325 of footer 300, locking the vertical leg portion in place. To fold the cot 1, the user just bends back the bottom of each of the clips 80 allowing the vertical leg portions 110, 120, 130, 140 to separate while allowing the crossed rods (see 150, 160 FIG. 13C) to fold against one another in the direction of arrow F.

In an assembled position, the lower ends of vertical leg portions 110, 120, 130, 140 fit into top opening 315 in the top 310 of footer 300, and can be locked in place by the pin 84 of bendable-snapable clip 80, which mateably fits into opening 325 in side 320 of footer 300.

Figure 10:
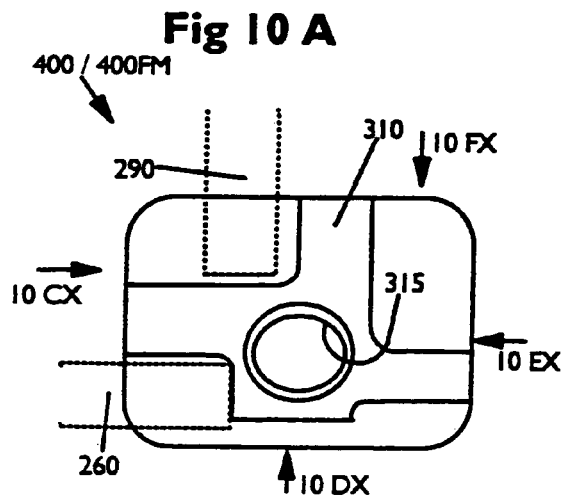
FIG. 10A is an enlarged top view of one of the mid-point fittings used with the mid-vertical legs of the cot.
FIG. 10B is a bottom view of the fitting of FIG. 10A.
FIG. 10C is a side view of the fitting of FIG. 10A along arrow 10CX.
FIG. 10D is a side view of the fitting of FIG. 10A along arrow 10DX.
FIG. 10E is a side view of the fitting of FIG. 10A along arrow 10EX.
FIG. 10F is a side view of the fitting of FIG. 10A along arrow 10FX.
Figure 10:
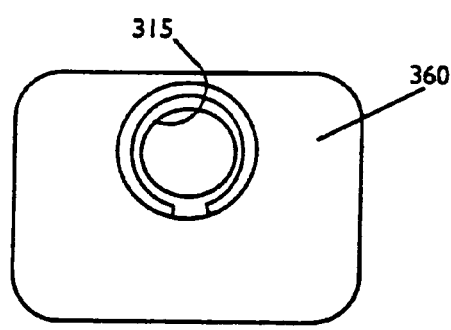
Figure 10:
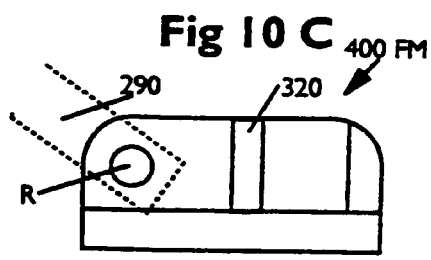
Figure 10:
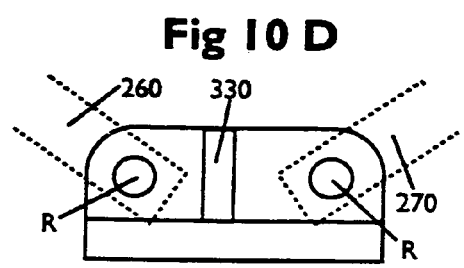
Figure 10:
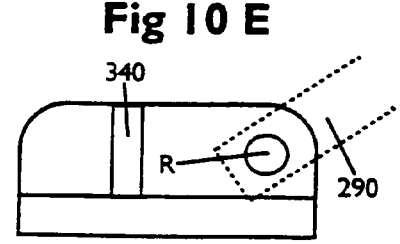
Figure 10:
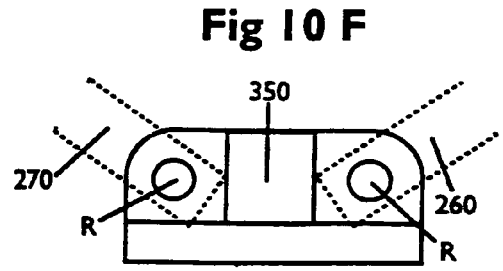

FIG. 10A is an enlarged top view 310 of one of the mid-point fittings 400 which can be formed from injection molded plastic and can be used with the mid-vertical legs 210, 220, 230, 240, 190, 290 and 250, 260, 270, 280, 290, 190 of the cot 1. FIG. 10B is a bottom view 360 of the fitting 400 of FIG. 10A with an optional through-hole 315 (also shown in FIG. 10A) which can be used for supporting an optional extra vertical leg portion. FIG. 10C is a side view 320 of the fitting 400 of FIG. 10A along arrow 10CX. FIG. 10D is a side view 330 of the fitting 400 of FIG. 10A along arrow 10DX. FIG. 10E is a side view 340 of the fitting 400 of FIG. 10A along arrow 10EX. FIG. 10F is a side view 350 of the fitting 400 of FIG. 10A along arrow 10FX.

The fitting 400 will now be described referencing the front lower middle fitting 400FM shown in FIGS. 1, 2 and 7. As previously described, the cot 1 can have a centrally located cross-brace of rods 190, 290 pivotably attached to one another by a rivet R. Front ends of middle cross-brace rods 190, 290 can each be pivotably attached to fitting 400 by rivets R (see for example 290, R FIGS. 10C, 10E). A bottom end of front left cross-brace rod 260 can be pivotably attached to fitting 400 by a rivet R (see FIGS. 10D, 10F), and a front right cross-brace rod 270 can be pivotably attached to fitting 400 by a rivet R (see FIGS. 10D, 10F). The fitting 400 can be used upside down for connecting to snapable mid-portion fastener buttons 52, 54 which together sandwich and fixably hold the platform 30 in place.

In a fully assembled state as shown by the preceding figures, the cot 1 has been tested to be able to support up to approximately 150 pounds with ease. The fully assembled cot 1 has dimensions of the planar support surface 30 being approximately 24 inches wide by approximately 46 inches long and can be supported approximately 10 inches above a ground surface, with the canopy cover being approximately 36 inches high above a ground surface. The total weight of the cot 1 with canopy 10 is approximately 15 pounds.

FIG. 11 is a perspective view of the assembled cot 1 of FIG. 1 with the canopy 10 shown in FIG. 1 removed FIG. 12 is another view of the cot 1 of FIG. 11 with the canopy support rods 22, 23, 24, 25, 26, 27, 28 removed. FIG. 12 is also a view of the third and fourth embodiment of the present invention, a cot with sidewalls on the left, right and rear sides. The support rods can be sections of ⅝-inch pipe that can be assembled to resemble upside down U-shapes having ends that can be telescopingly received within the upper ends of the vertical leg portions 110, 120, 130, 140, respectively. The vertical leg portion 130 is not shown in FIG. 12, however, it is identified in FIGS. 3 and 5 as the right rear vertical leg. For disassembly, the canopy support rods can be removed.

FIG. 13A is a perspective view 1' of the front of the cot 1 of FIG. 12 in the process of being folded in the direction of arrow CF. FIG. 13B is another front view of FIG. 13A showing the cot 1" being further folded together. FIG. 13C is a left side view of FIG. 13B along arrow 13CX. As can be seen from FIGS. 13A–13C, the left and right sides, and the front and backsides can fold up in an accordion type position very easily.

Figure 14:
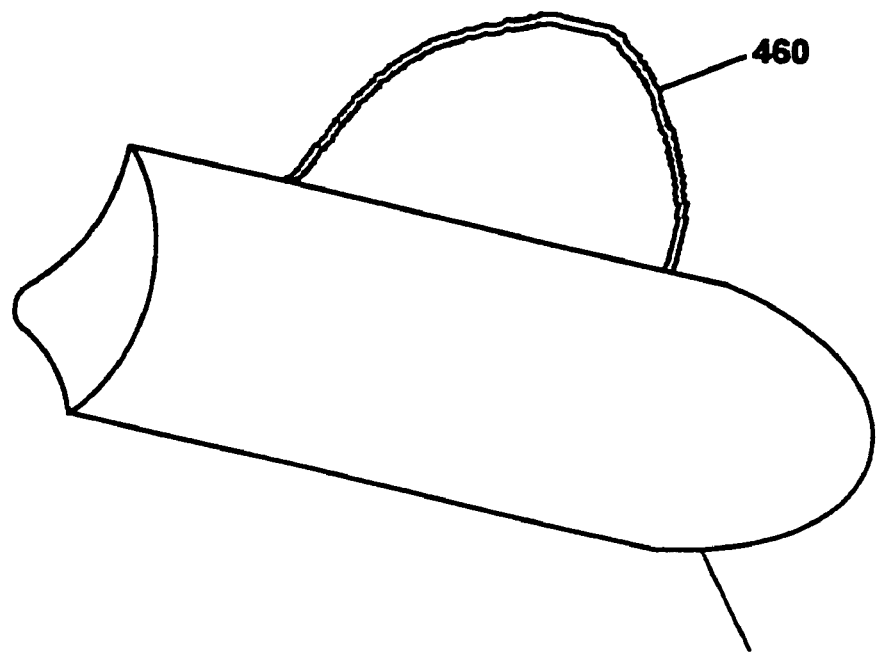
FIG. 14 shows a bag holder that contains the folded cot of the preceding figures.
Figure 15:
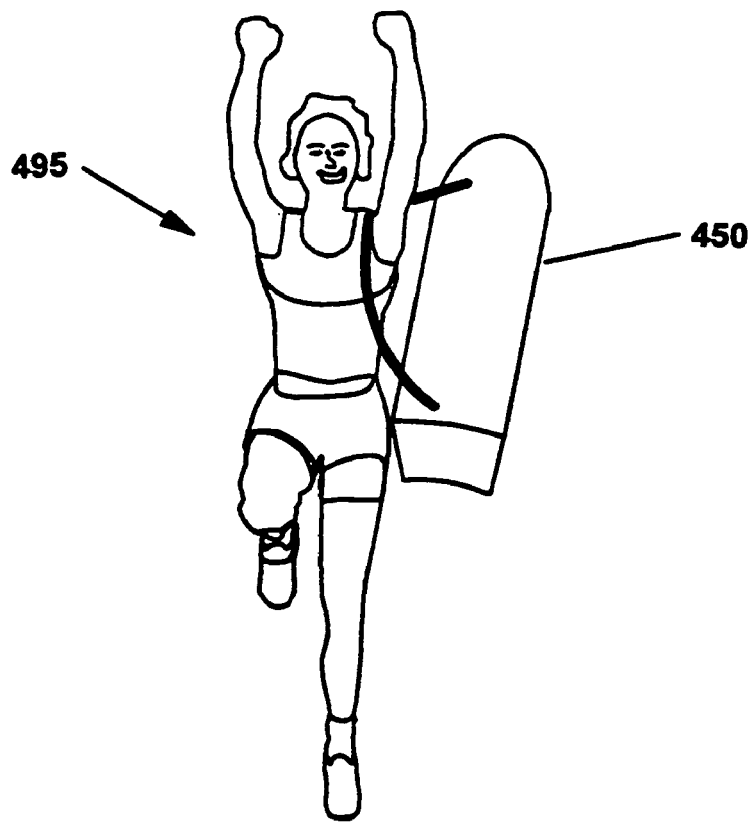
FIG. 15 is a perspective view of a child user carrying the filled bag holder of FIG. 14.

FIG. 14 shows a bag holder 450 that can be formed from canvas, nylon, and the like, with shoulder strap/handle 460 that contains the folded cot 1" of the preceding figures with or without the canopy 10 and disassembled canopy support rods 20 (shown in FIG. 11). The bag allows the folded cot 1' to be in held within a bag having dimensions of approximately 8 inches wide by approximately 8 inches high by approximately 30 inches long. The bag 450 and the folded cot 1 has a weight of still approximately 15 pounds. FIG. 15 is a perspective view of a child user 495 carrying the filled bag holder 450 of FIG. 14.

All embodiments of the invention can be included in a carrying bag that can be easily carried by small children. A nine year old can assemble the invention in approximately two minutes, and many four year olds can easily carry the invention. The collapsed version of the novel bed/cot and stair step can be placed in a bag with dimensions of approximately 30 inches by approximately 8 inches by approximately 8 inches and can weigh approximately 15 pounds.

While the first embodiment of the invention with canopy has been shown, the invention can use other types and shapes and features that can include but are not limited to closing the fronts and all the sides with see-through or screened material to contain a child or pet inside, as described in the second embodiment below.

Figure 16:
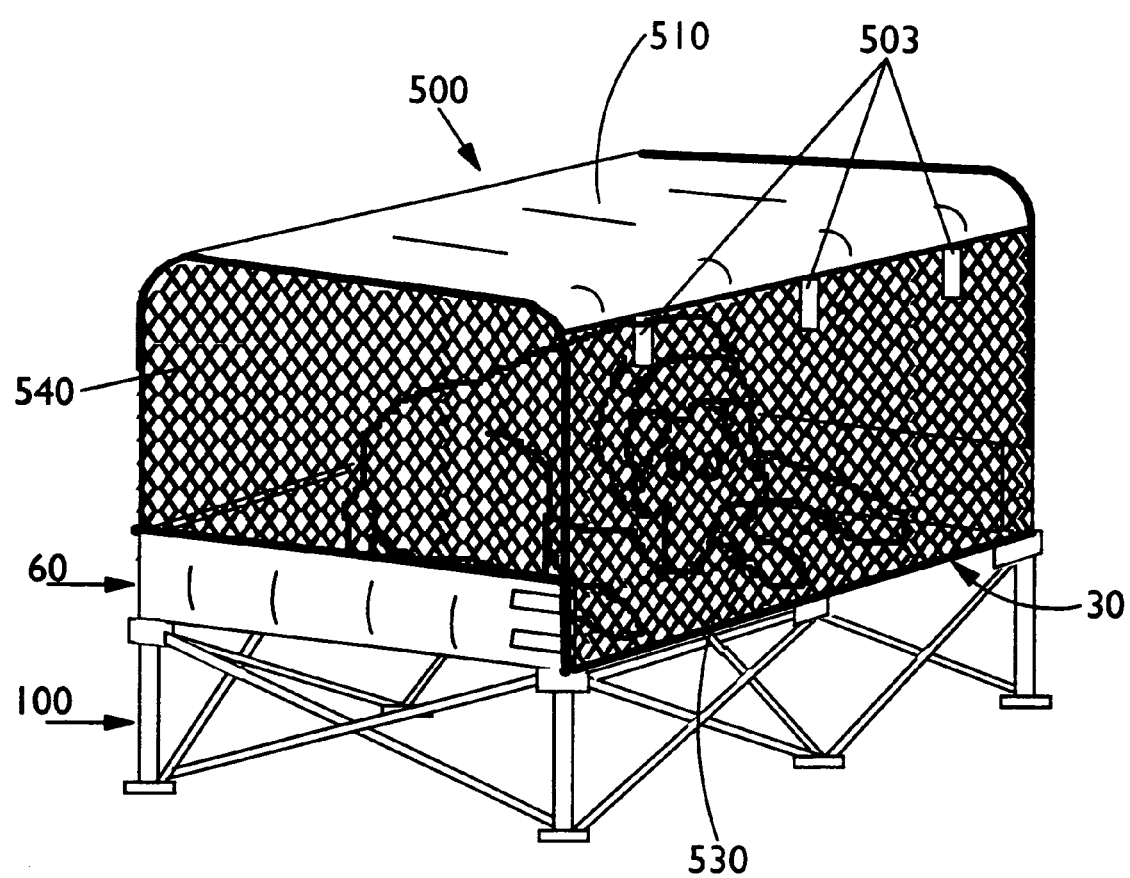
FIG. 16 is a perspective view of a second embodiment of the novel portable, collapsible cot fully assembled with hutch-like mesh enclosure secured with straps.

FIG. 16 shows a novel portable, collapsible, lightweight cot fully assembled with a hutch-like enclosure 500 constructed of flexible, lightweight materials, such as, but not limited to canvas, nylon, natural and synthetic fabric with a close weave to form one or more sides of the enclosure. The closely woven fabric is of a lighter weight or finer denier than the rayon or nylon fabric used for the cot and sidewalls. A material with an open weave, such as, nylon mesh, fish net and the like may be used to form the sides of the enclosure not made of a closely woven material. The open weave material can be used to provide ventilation for the occupant of the hutch-like compartment. Although the second embodiment illustrated in FIGS. 16–26 shows the use of mesh material on three sides: left side 520, front side 530, and right side 540, it is not a limitation of the present invention, but a matter of individual preference as to how many sides are made of the mesh material.

The hutch-like enclosure 500 is formed by sewing four pieces of flexible, lightweight material to form an upside down U-shaped hollow compartment having a total of five sides, that fits over the flexible platform 30 being approximately 24 inches wide by approximately 46 inches long and can be supported approximately 10 inches above a ground surface, with the hutch-like compartment 500 being approximately 36 inches high above a ground surface. The flexible, lightweight material forming the hutch-like compartment is supported by a frame, which is shown in greater detail in FIGS. 27–33. The overall dimensions of the hutch-like compartment are approximately 45 inches long, by approximately 27 inches high and approximately twenty-four inches wide. The total weight of the cot 1 with hutch-like compartment 500 is approximately 15 pounds.

Hook and loop fasteners, such as Velcro® strips (not shown) are sewn along the edges of the sidewalls 60 and matching hook and loop fasteners, such as, Velcro® strips (not shown) are sewn along the back and/or side bottom edges of the hutch-like enclosure so that when the hutch-like enclosure is in place, the hutch-like compartment 500 aligns smoothly and securely to the sidewalls 60 when the fastener strips on the sidewalls 60 are mated with the fastener strips on the hutch-like compartment 500.

Figure 23:
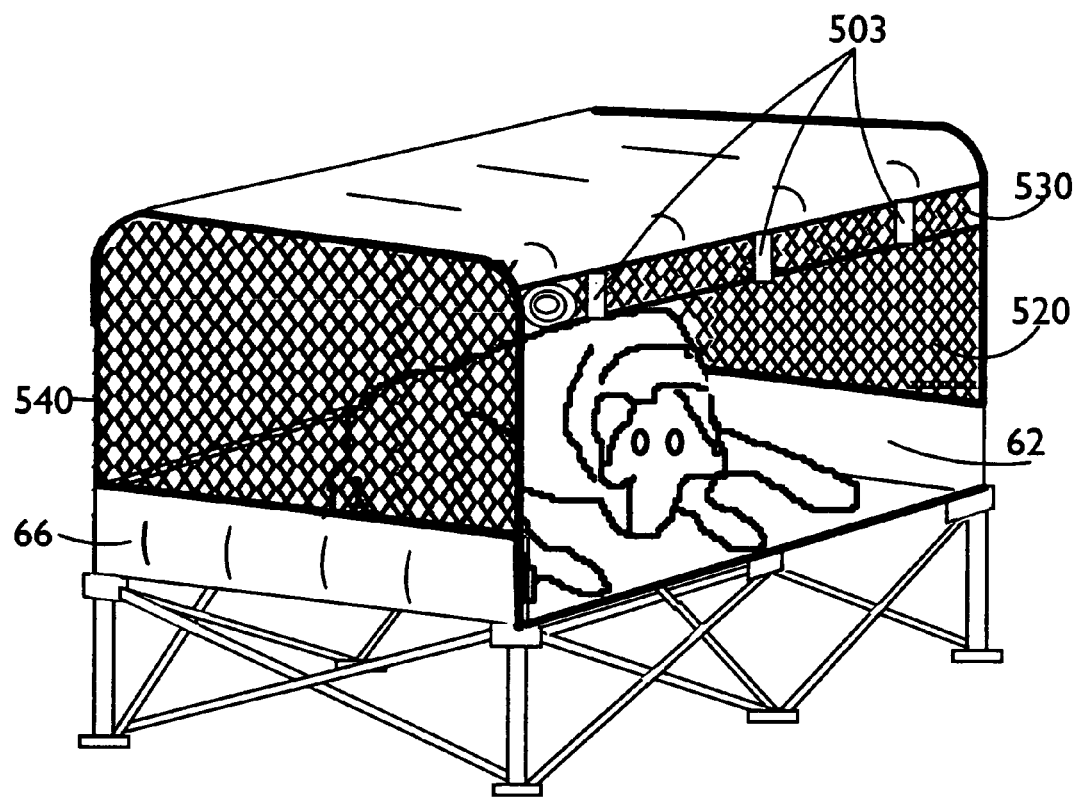
FIG. 23 is a perspective view of the cot in FIG. 16 with the front covering mesh rolled up and strapped in an open position.

To facilitate access to the interior of the hutch-like compartment, a series of three hook and loop fastener straps, such as Velcro®, 503 are sewn into the seam between the closely woven fabric 510 and the open weave mesh 530 and can be used to hold the front mesh 530 in an open position, as desired and shown in FIG. 23.

The leg member section 100, flexible platform 30 and sidewalls 60 are constructed in a manner similar to that described in the first embodiment with canopy.

Figure 17:
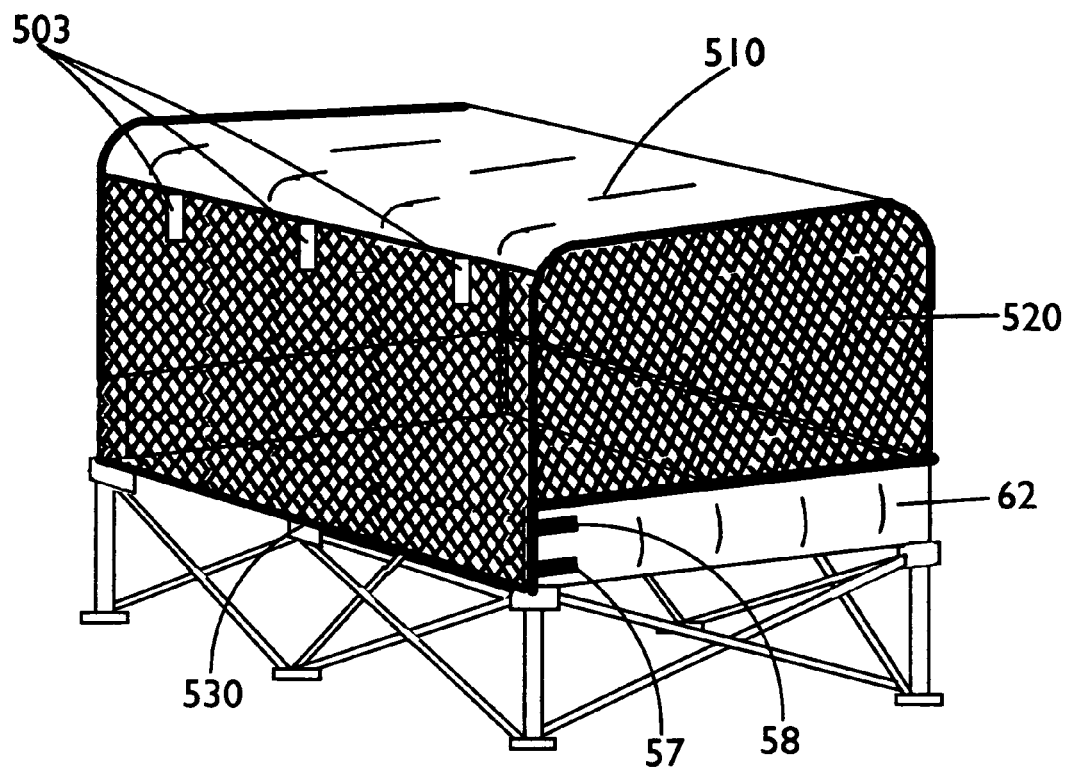
FIG. 17 is a right front view of the cot in FIG. 16.

Referring now to FIG. 17, two hook and loop fasteners, such as Velcro®, s7 s8 can be attached to the front right end section of the mesh 530 to close the front right edge of the mesh to the sidewall 62. Similarly, in FIG. 18, two hook and loop fasteners, such as Velcro® s9 s10 can be sewn to the left front edge of the mesh 530 and used to close the left front edge of mesh 530 to the sidewall 66.

Figure 18:
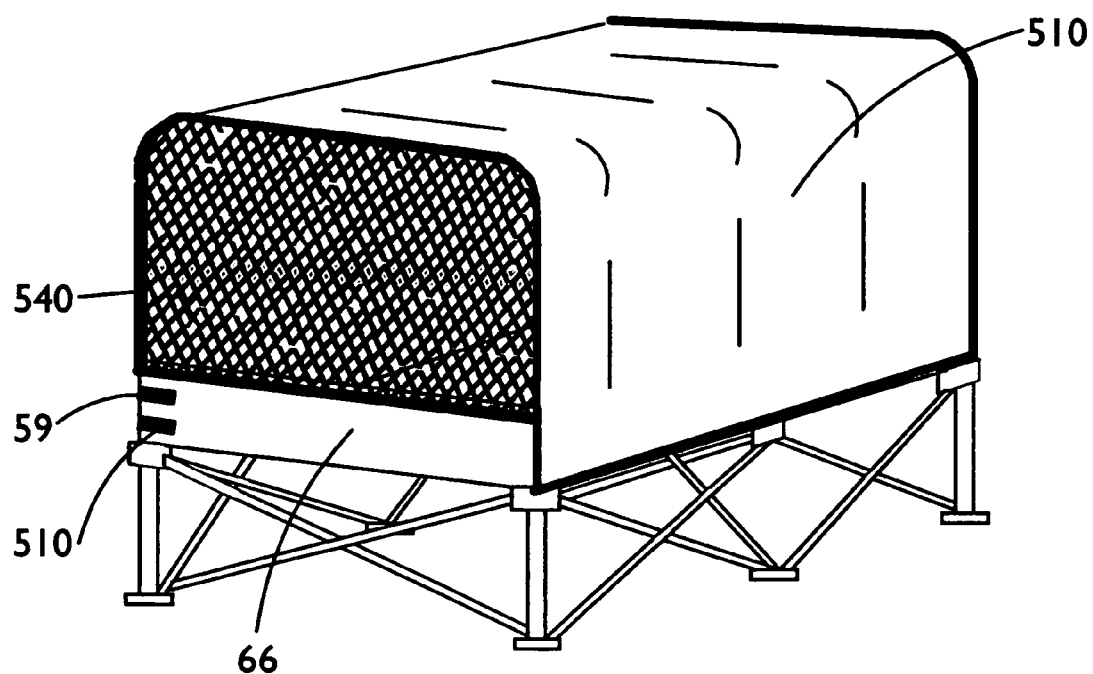
FIG. 18 is a left rear view of the cot in FIG. 16.

FIGS. 17 and 18 also show the four pieces of material used to form the hutch-like enclosure. One piece 510 forms the back and top sections of the enclosure, and three pieces of mesh, include one piece of mesh 520 to cover the right side, another piece of mesh 530 to cover the front and a third piece of mesh 540 to cover the left side. The one piece 510 that forms the back and top sections is preferably a closely woven fabric with waterproof qualities and of a lighter weight than the nylon or rayon material used for the cot. Velcro® strips (not shown) are sewn along the top edges of the sidewalls 60 and matching Velcro strips (not shown) are sewn along the back and/or side bottom edges of the hutch-like enclosure so that when the enclosure is in place, the hutch-like compartment 500 aligns smoothly and securely with the sidewalls 62, 64, and 66.

Figure 19:
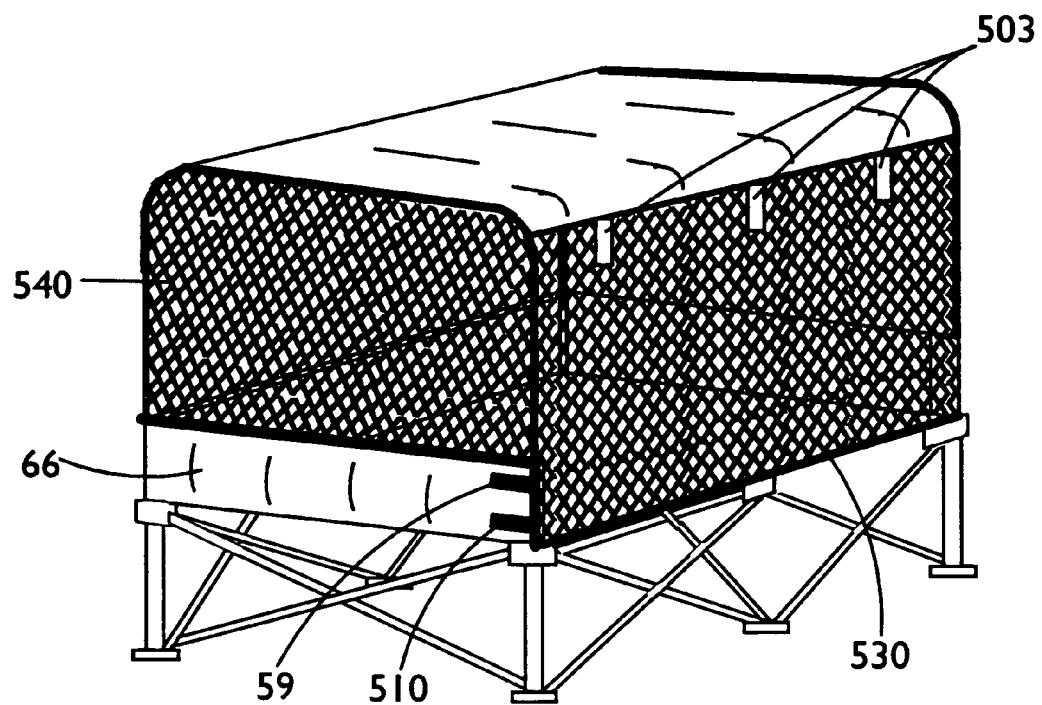
FIG. 19 is a left front view of the cot in FIG. 16.
Figure 20:
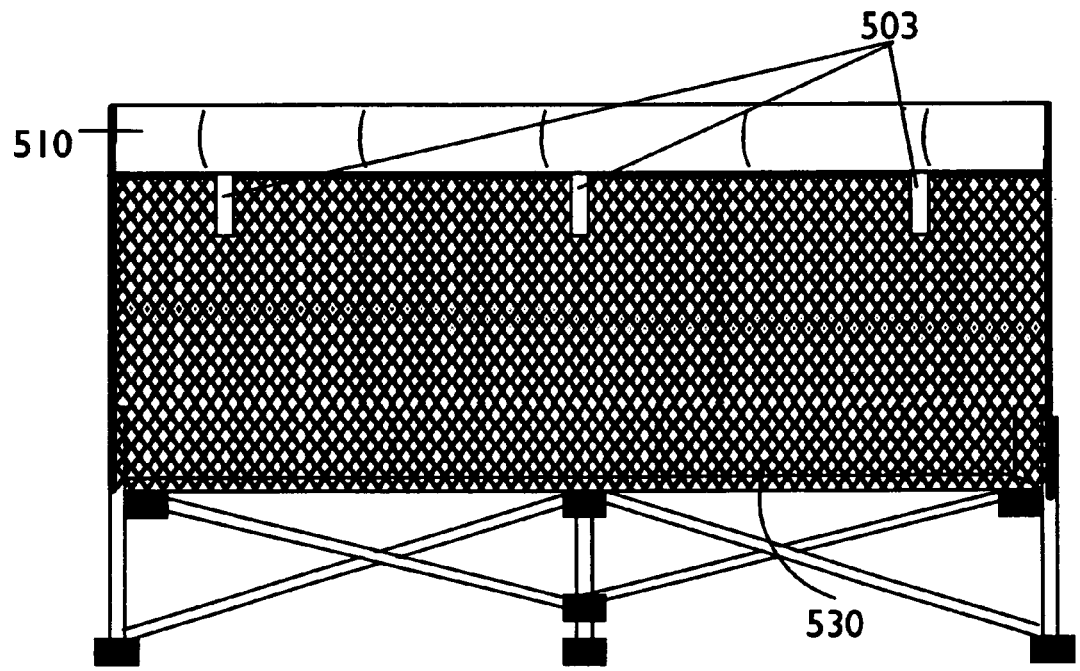
FIG. 20 is a front view of the cot in FIG. 16.

FIG. 19 is a left front view of FIG. 16 without an occupant. Hook and loop fasteners s9, s10 are sewn to the left edge of front mesh 530 and used to securely close the left front mesh to sidewall 66. In FIG. 20 the front view of the cot with the hutch-like compartment shows the placement of the front seam connecting the closely woven fabric 510 to the openly woven mesh 530. The seam is positioned below the top edge of the upside down U-shaped support rods to create a shade or barrier to the elements, such as sun, wind or rain, it also creates less stress on the seam into which a series of hook and loop fasteners, such as Velcro® 503 are sewn. For example, if the front cover has an overall length of approximately 30 inches, five inches from the top of the compartment, the material is of a the closely woven material 510. Thus, the material on the front of the compartment would preferably have from approximately 15% to approximately 20% of a solid or closely woven material at the top of the front cover and approximately 80% to approximately 85% of mesh material at the bottom of the front cover.

Figure 21:
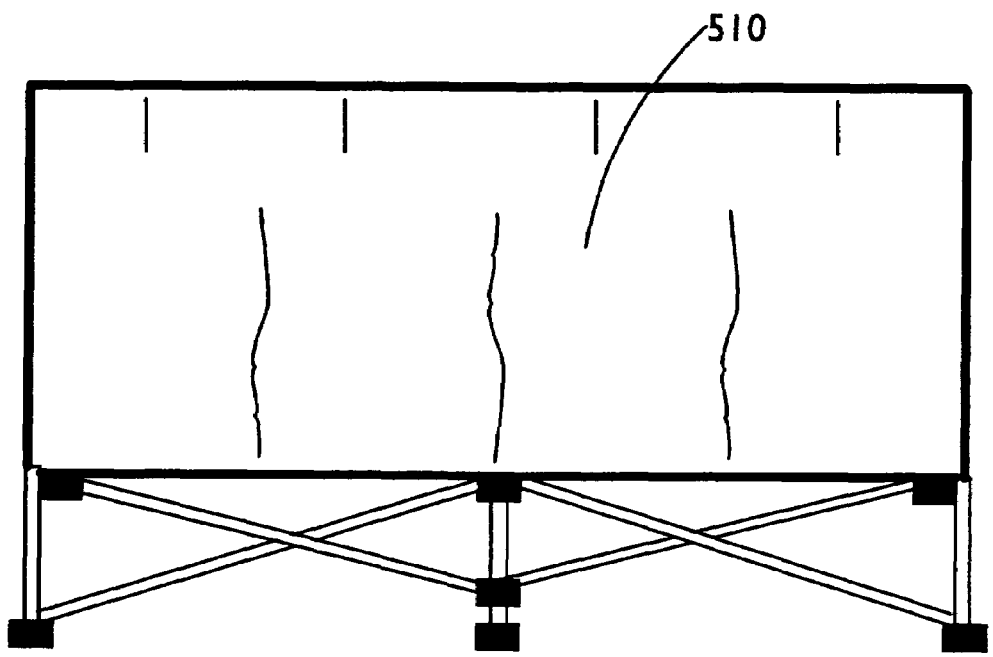
FIG. 21 is a rear view of the cot in FIG. 16.
Figure 22:
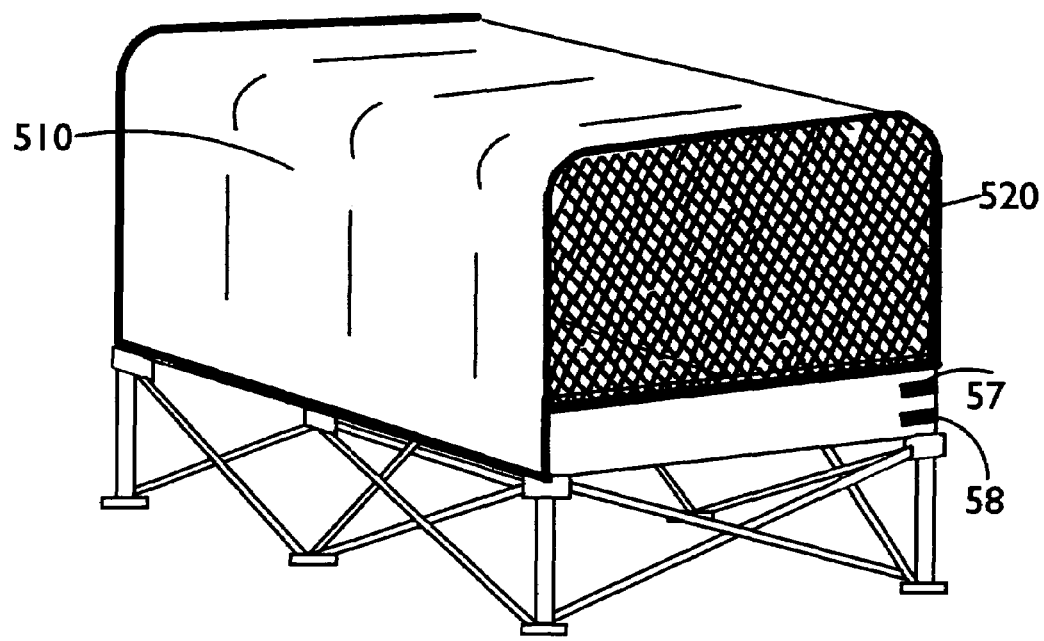
FIG. 22 is a right rear view of the cot in FIG. 16.

FIG. 21 is a rear view of the closely woven material 510 on the rear side of the hutch-like compartment. In FIG. 22, the flexible, closely woven material 510 is used on the top and back side and the right side 520 is made of an open weave mesh material. The front cover 530 (not shown) is fastened at the front right edge by two hook and loop fasteners, s7, s8.

In FIG. 23, the front mesh cover 530 is rolled up and strapped into an open position by a series of three hook and loop fasteners 503. It is to be understood that the number of fasteners in the series can be more or less than three. It is not a limitation of the invention and any reasonable number of fasteners can be chosen for the series.

Figure 24:
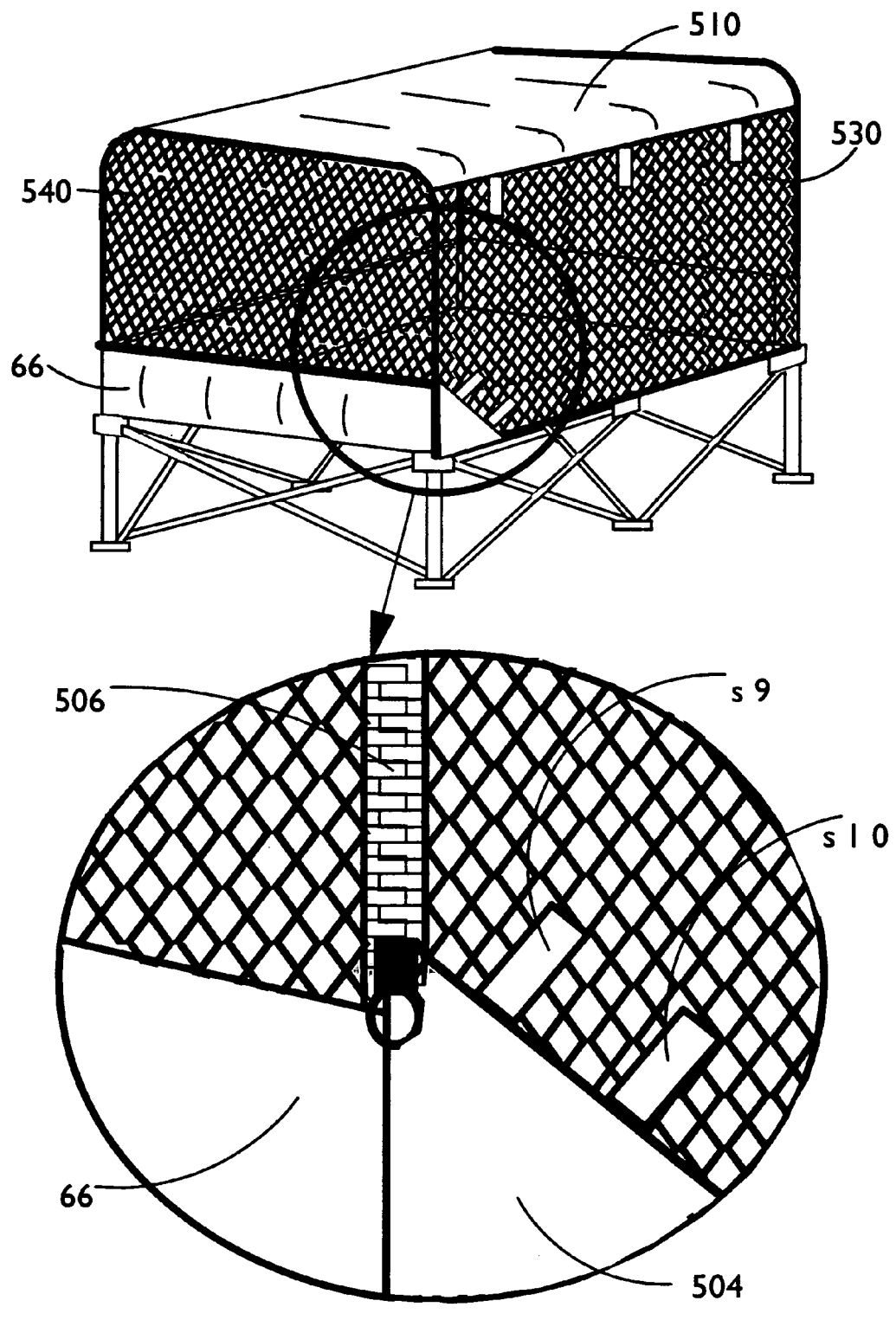
FIG. 24 is an enlarged view of the straps and zipper for closing the mesh corners of the hutch-like enclosure.

FIG. 24 shows an alternate arrangement for closing the corners of the front mesh cover 530. A triangular-shaped piece of a closely woven fabric, such as canvas, nylon, synthetic or natural fabric or combinations thereof, is sewn onto the left corner 504 of the front mesh 530. The corner fabric 504 reinforces the left corner and provides a stronger seam for attaching hook and loop fasteners s9, s10. FIG. 24 also shows the use of a zipper 506 in the left vertical seam to securely close the left front edge of the hutch-like compartment. The arrangement in FIG. 24 is shown for the left front corner, and can also be used for the right front corner whenever there is a need for reinforcement and added security for each closure.

Figure 25:
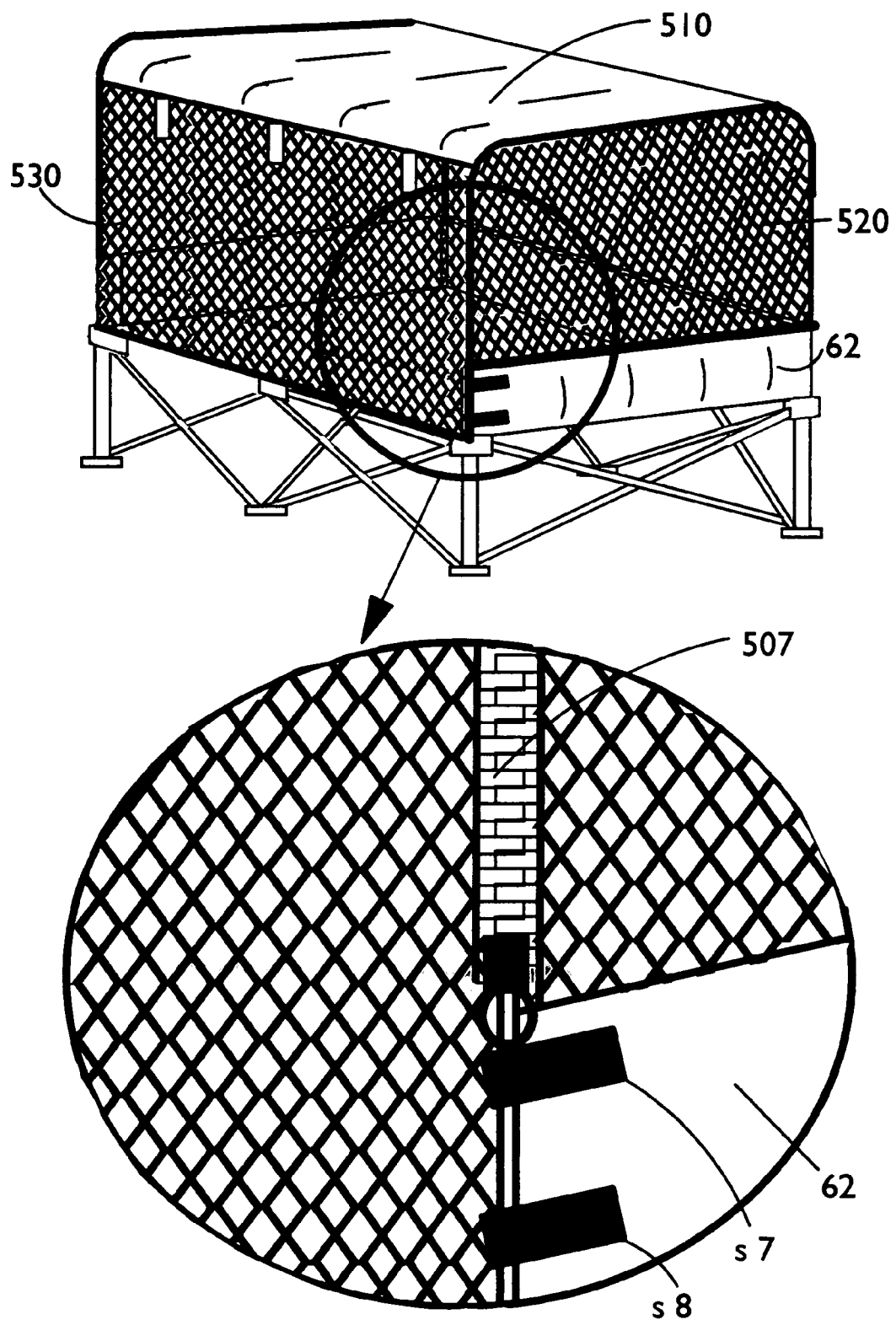
FIG. 25 is an enlarged view of the right front straps and zipper for closing the hutch-like enclosure.
Figure 26:
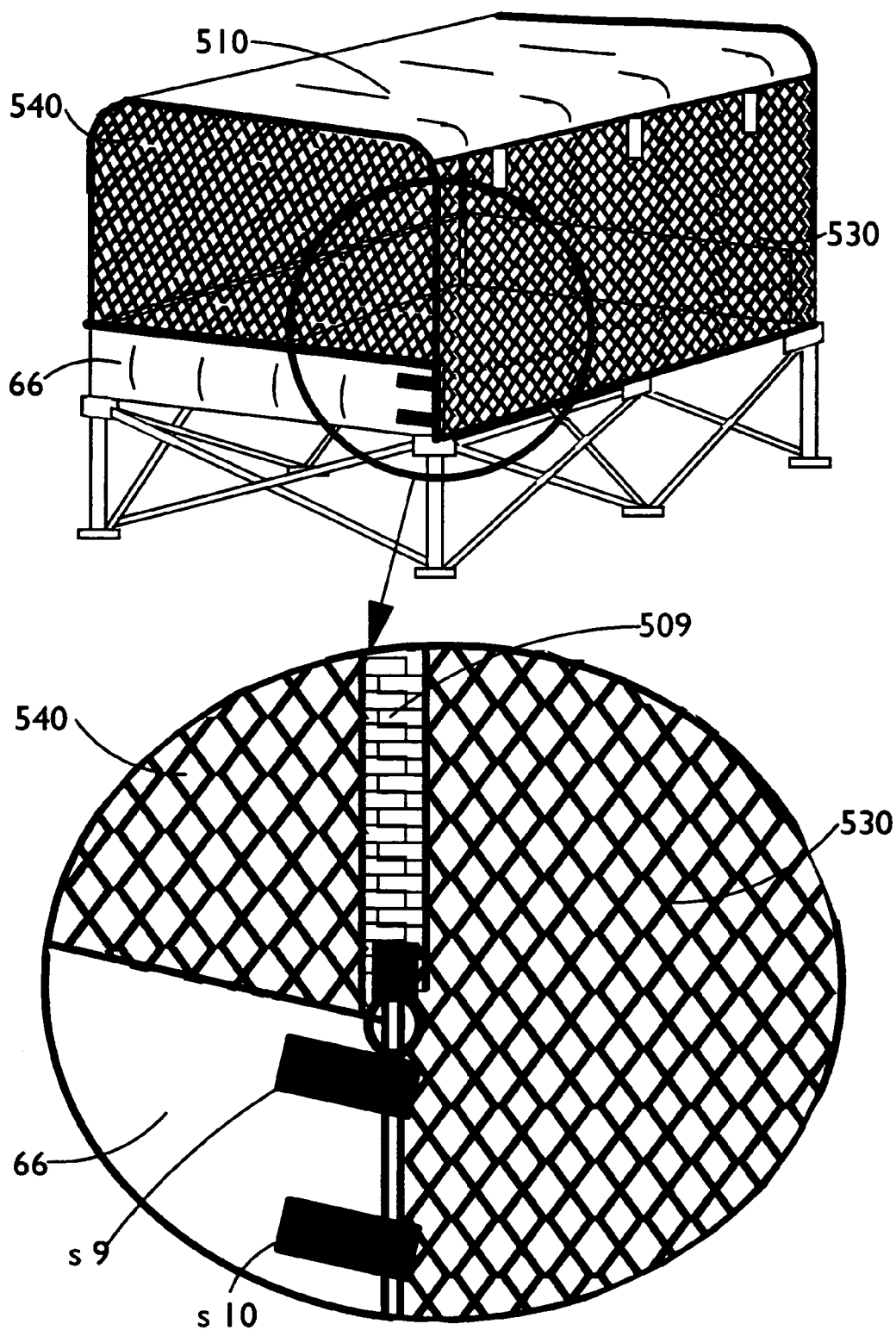
FIG. 26 is an enlarged view of the left front straps and zipper for closing the hutch-like enclosure.

FIG. 25 shows a zipper 507 and two hook and loop fasteners s7, s8 fastened to right sidewall 62. Similarly, FIG. 26 shows zipper 509 and two hook and loop fasteners s9, s10 fastened to the left sidewall 66. The zipper and fastener arrangement in FIGS. 25 and 26 are without the additional reinforcement of front corners shown in FIG. 24, and can be used to provide a more secure environment for an occupant of the hutch-like compartment.

Figure 27:
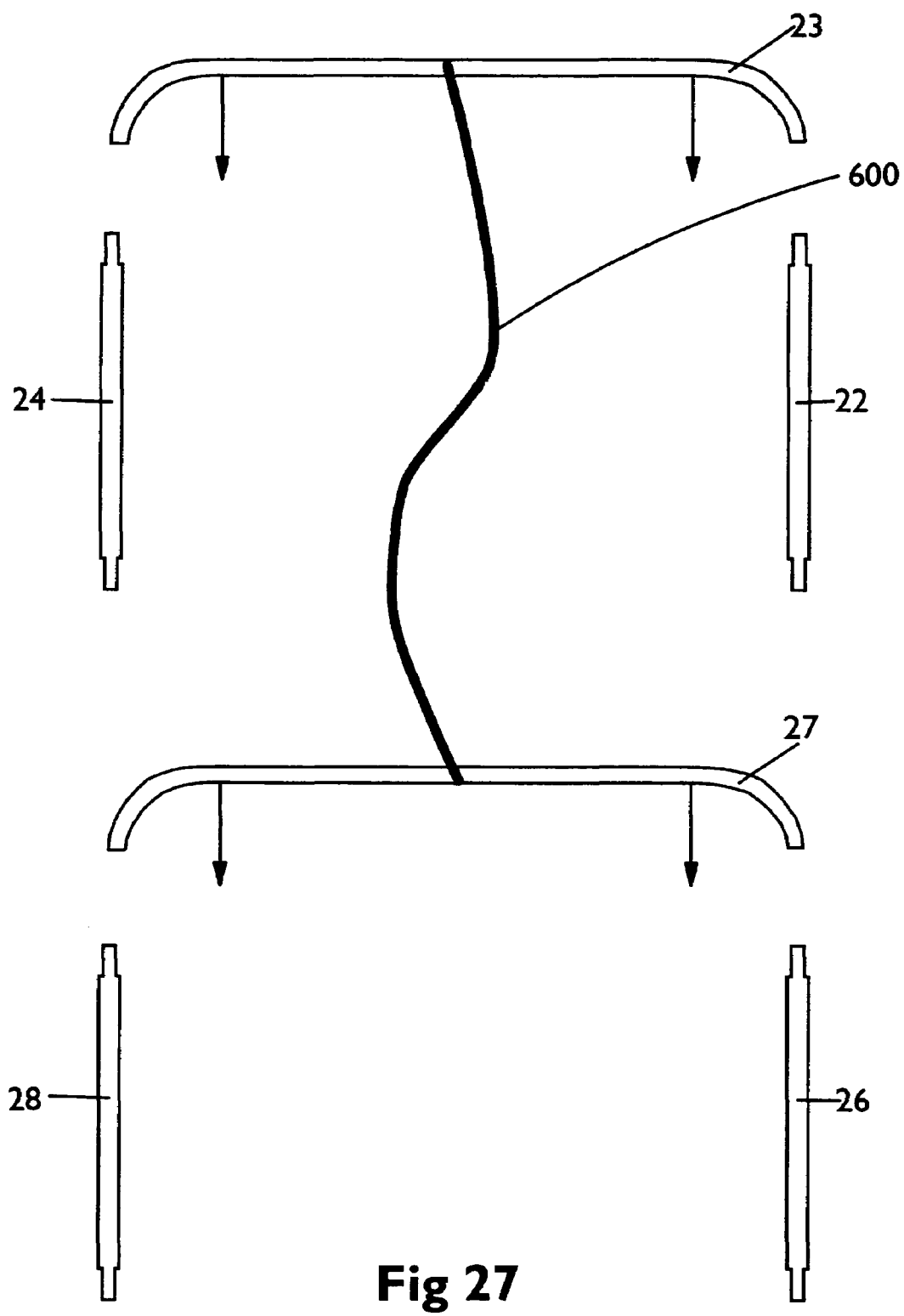
FIG. 27 is an exploded view of the first and second upside down U-shaped rods attached by a strap extending from opposite sides of the cot to support the hutch-like enclosure of the second embodiment of the present invention.

FIG. 27 is an exploded view of the upper tubing frame that supports the hutch-like compartment over the cot in FIG. 16. One upside down U-shaped frame is formed when side tubes 22 and 24 are connected to a cross bar or tube 23. Another upside down U-shaped frame is formed when side tubes 26 and 28 are connected to a cross bar or tube 27. The tubes can be made of metal, plastic or any sturdy, lightweight material that forms a hollow tube, approximately ⅝-inch in diameter, and can be shaped to allow the vertical tubes 22, 24, 26 and 28 to fit snugly into cross bars and tubes 23 and 27 respectively. A strap 600 having loops on each end to slide over each cross bar 23 and 27 is used to connect and stabilize the cross bars 23 and 27. The strap 600 is preferably aligned to approximately the middle of each cross bar when it is at the top of the upside down U-shaped supports. In this position, the strap 600 also supports the top mid-section of the flexible hutch-like compartment. The strap 600 can be made of cloth, canvas, nylon rope, woven fabric and the like; the dimensions are approximately 46 inches in length and approximately 1 inch in width and extends from one side of the cot to the opposite side.

Figure 28:
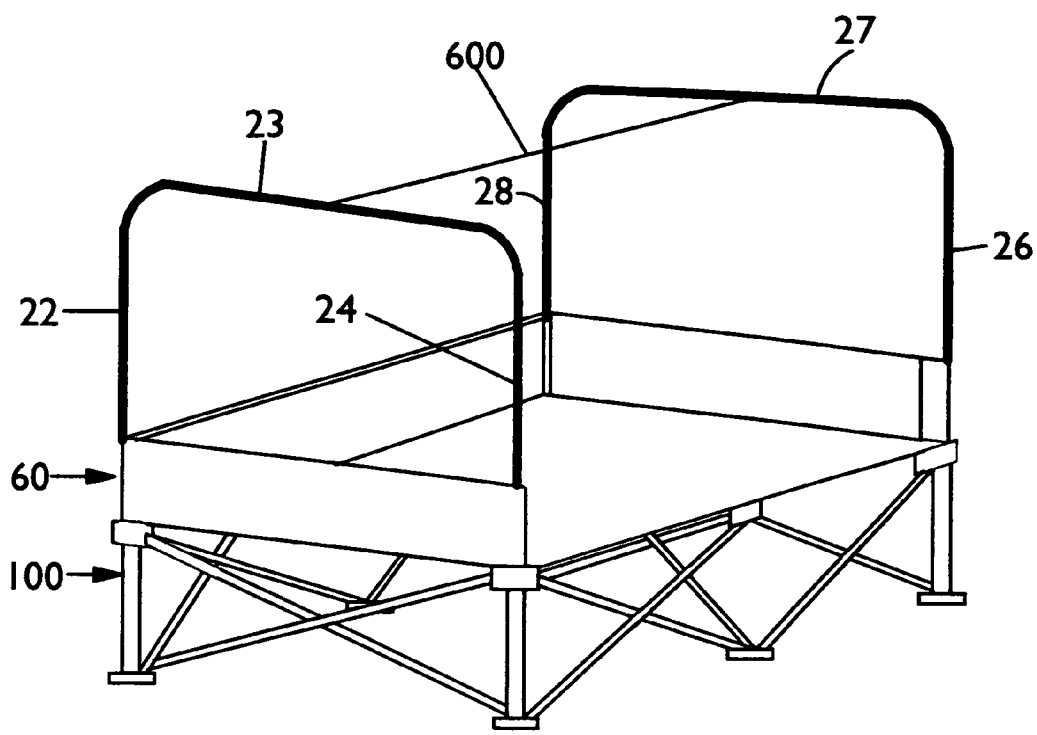
FIG. 28 is a left front view of the cot of FIG. 16 with a strap extending from one side of the cot to the opposite side and connecting the upside down U-shaped support rods attached to the cot.
Figure 29:
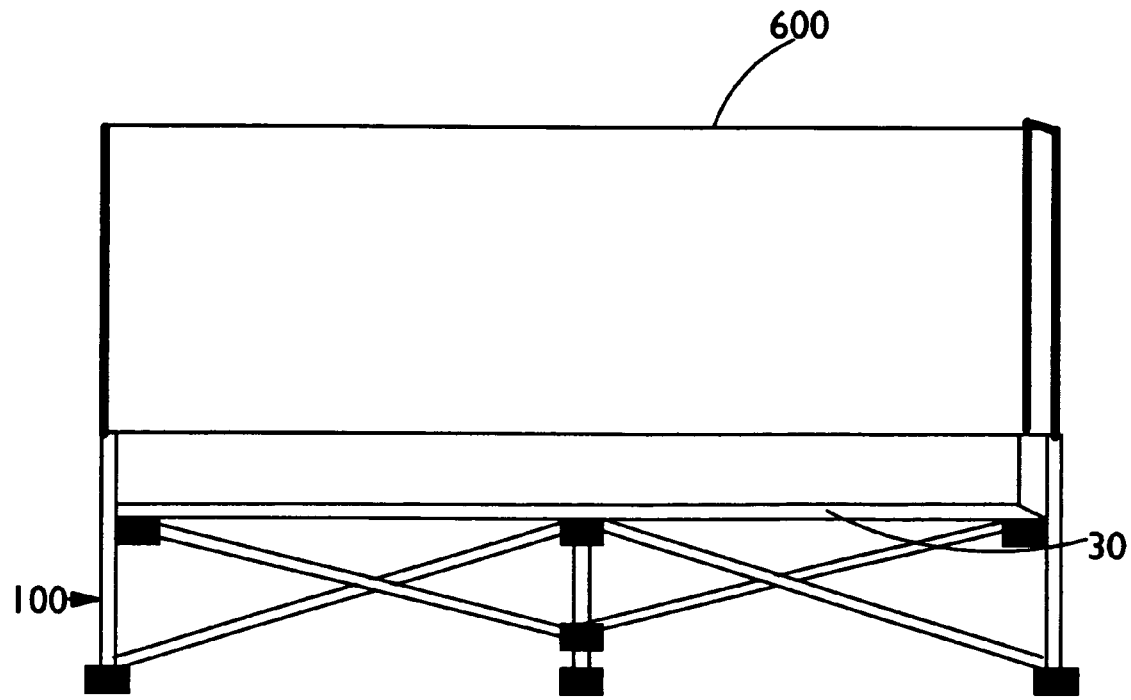
FIG. 29 is a left front view of FIG. 28.
Figure 30:
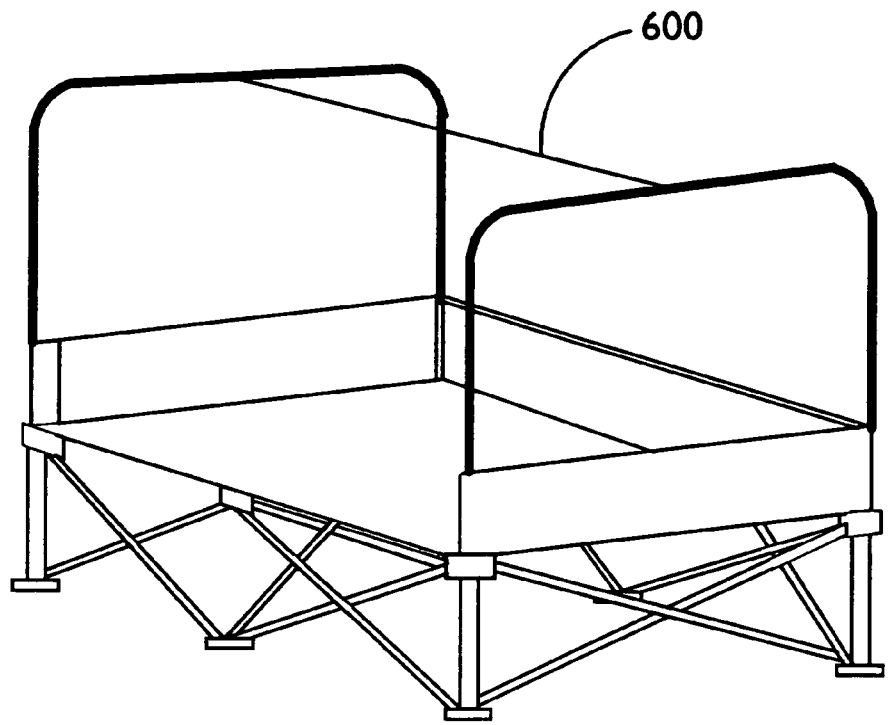
FIG. 30 is a right front view of FIG. 28.
Figure 31:
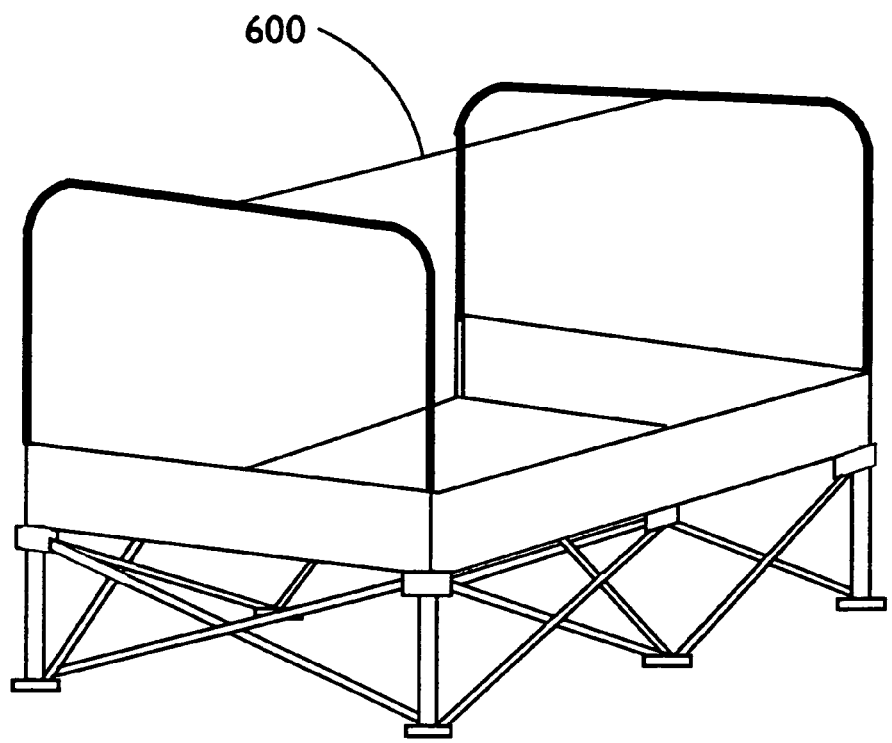
FIG. 31 is a left rear view of FIG. 28.
Figure 32:
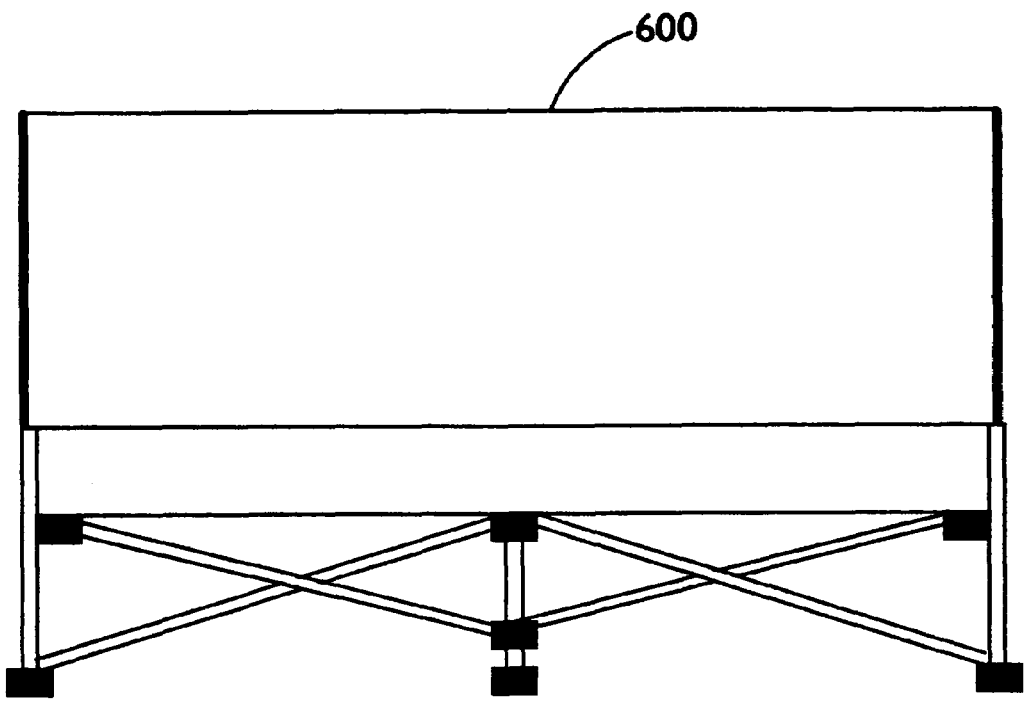
FIG. 32 is a rear view of FIG. 28.
Figure 33:
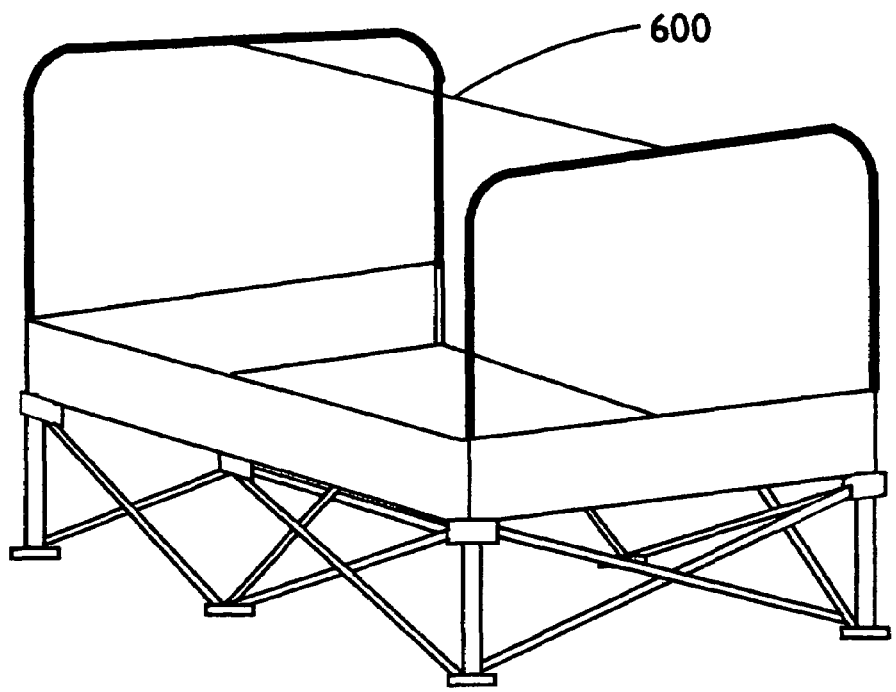
FIG. 33 is a right rear view of FIG. 28.

FIG. 28 is a left front view of the upside down U-shaped support frame with strap 600 connecting the upper tubing 23 and 27. FIG. 29 is a front view of FIG. 28; FIG. 30 is a right front view of the upper support frame; FIG. 31 is a left rear view of the upper support frame; FIG. 32 is a rear view of the upper support frame and FIG. 33 is a right rear view of the upper support frame first shown in FIG. 28.

Figure 34:
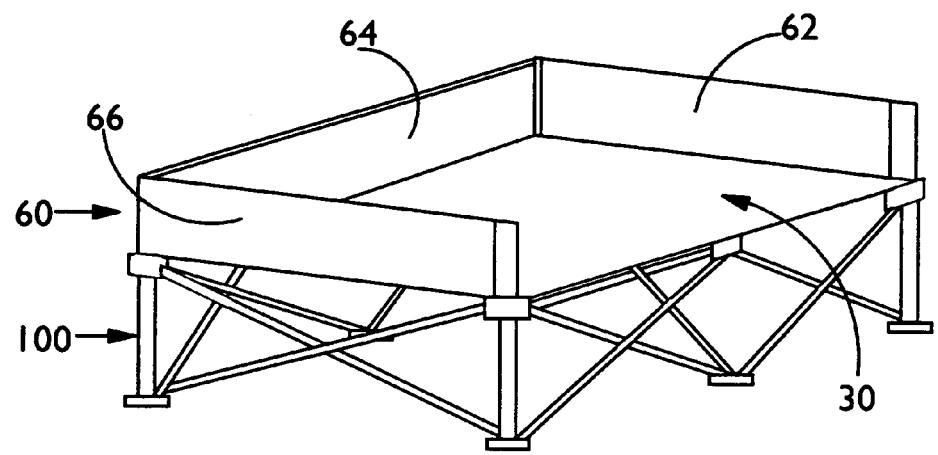
FIG. 34 is the left front view of the third embodiment of the present invention, the assembled cot of FIG. 16 with the hutch-like enclosure and upper support frame removed.
Figure 35:
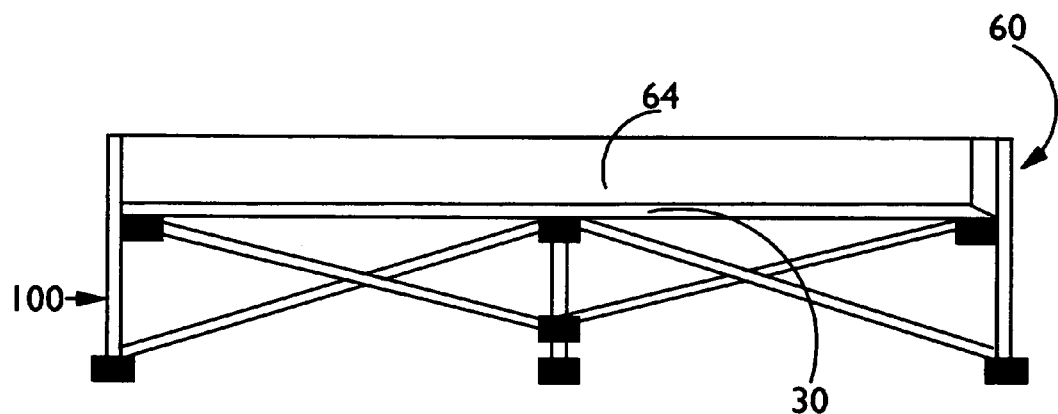
FIG. 35 is a left front view of the cot in FIG. 34.
Figure 36:
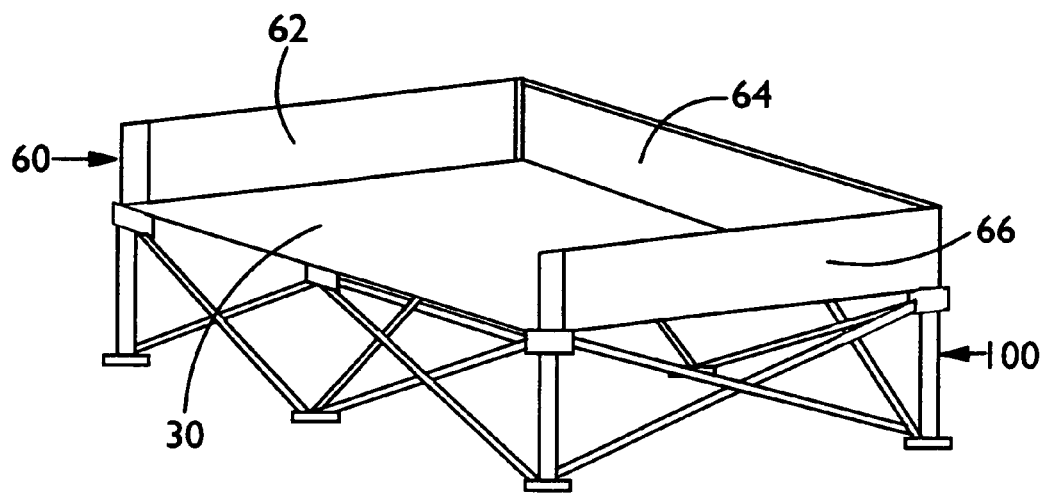
FIG. 36 is a right front view of the cot in FIG. 34.
Figure 37:
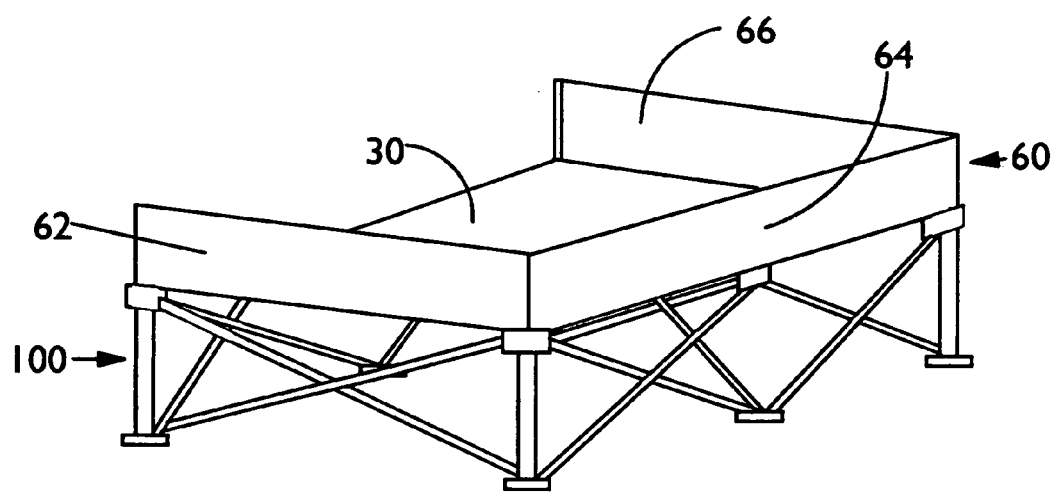
FIG. 37 is a left rear view of the cot in FIG. 34.
Figure 38:
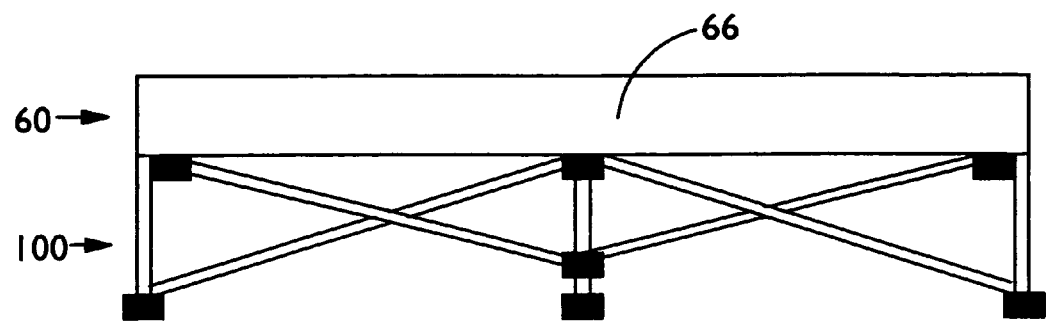
FIG. 38 is a rear view of the cot in FIG. 34.
Figure 39:
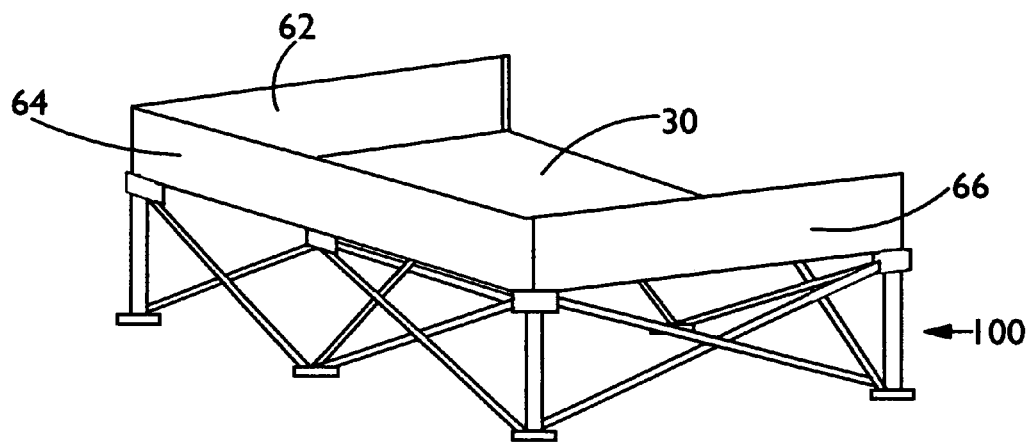
FIG. 39 is a right rear view of the cot in FIG. 34.

The third embodiment of the present invention is a cot with sidewalls as shown in FIG. 34. A perspective view of the invention shows the leg member section 100, flexible platform 30 and sidewalls 60 constructed in a manner similar to that described in the first embodiment with canopy. Additional features are sidewall 62 on the right side, 64 on the backside and 66 on the left side. The sidewalls are constructed of the same flexible, lightweight material as the cot and extend upwardly to provide a barrier to keep the occupant from falling to the ground or floor while sleeping. FIG. 35 is a front view of the cot in FIG. 34. FIG. 36 provides a right front view of the cot in FIG. 34. FIG. 37 is a left rear view of the cot in FIG. 34; FIG. 38 is a rear view of the cot; FIG. 39 is a right rear view of the cot.

Figure 40:
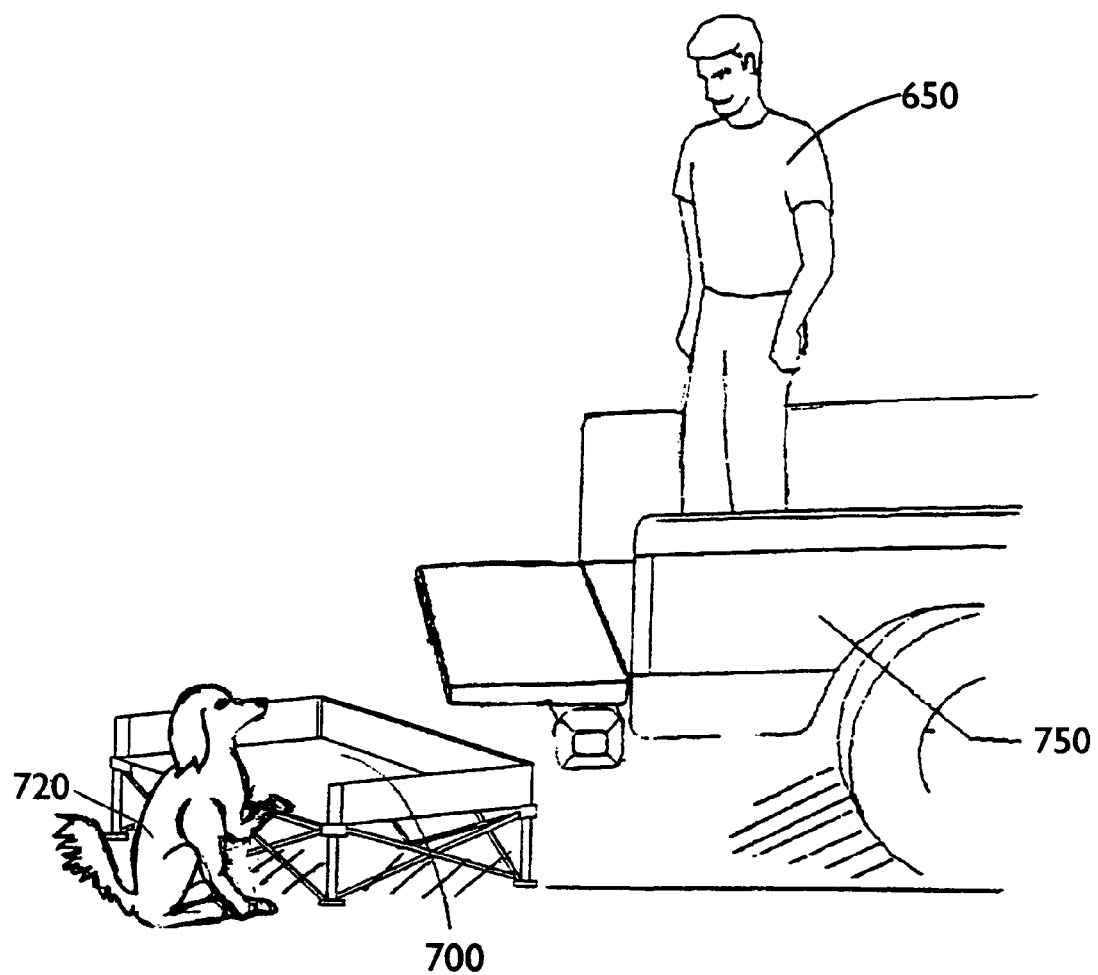
FIG. 40 is a perspective view of a fourth embodiment of the novel portable, collapsible, lightweight cot/platform used as a stair step.

The fourth embodiment of the present invention is illustrated in FIG. 40 wherein pet owner 650 places a stair step 700 in a position so that pet 720 can be assisted in climbing to the higher elevation of the truck bed 750.

Although the invention has been described as primarily being used for pets such as but not limited to dogs, cats, and the like, the invention can also be used for small children, and the like. The present invention meets the market demand for convenience, portability and ease of assembly and use.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A portable and collapsible cot, comprising:
a flexible planar surface layer; and
leg members for both cross-bracing and supporting the planar surface layer over a ground surface, the leg members being moveable between an assembled position and a folded position, where the assembled position fully supports weighted objects being placed on the planar surface layer, and the folded position has the cot in a collapsed position allowing the cot to become portable and easy to carry, the leg members include:
a first set of rods pivotably attached to one another for supporting a left side end of the cot that are moveable between a substantially crossed position while the cot is in the assembled position to a substantially parallel position while the cot is in a folded position;
a second set of rods pivotably attached to one another for supporting a right side end of the cot opposite the left side end, that are moveable between a substantially crossed position while the cot is in the assembled position to a substantially parallel position while the cot is in the folded position; and vertical leg portions extending downward from each of the corners of the planar surface layer having an upper end that remains attached to each of the corners of the planar surface layer, and a bottom end which engages a corner footer when the cot is in the assembled position, and the bottom end disengages the corner footer when the cot is in the folded position; and bendable-snapable members for connecting the bottom ends of the vertical leg portions to the corner footers when the cot is in the assembled position.

2. The cot of claim 1, wherein the leg members further include:

a middle set of rods for supporting a mid-portion of the cot located substantially midway between the left side end and the right side end, that are moveable between a substantially crossed position while the cot is in the assembled position to a substantially parallel position while the cot is in a folded position.

3. The cot of claim 1, wherein each of the bendable-snapable members include:

a longitudinal clip having one end fixably attached to a portion of each of the vertical leg portions above the bottom end of the vertical leg portions, the clip having an opposite end with a protruding pin for mateably engaging an opening in the corner footer for locking the cot in the assembled position, the pin end of the clip being bendable away from the corner footer for allowing the cot to be folded.

4. The cot of claim 1, further comprising:

first straps along perimeter edges attached underneath the surface layer for enhancing strength of the surface layer to support the weighted object thereon.

5. The cot of claim 4, first comprising:

second straps in a crossed pattern attached underneath the surface layer between the first straps attached to the perimeter edges.

6. The cot of claim 1, further comprising:

flexible side walls attached to and extending upward from at least one perimeter edge from the surface layer.

7. The cot of claim 6, wherein the side walls further include:

a left side wall attached to and extending upward from a left side perimeter edge of the surface layer;

a right side wall attached to and extending upward from a right side perimeter edge of the surface layer, opposite the left side wall; and a rear side wall attached to and extending upward from a rear side perimeter edge of the surface layer located between the left side wall and the right side wall, wherein the left side wall, the right side wall, and the rear side wall keep the object on the surface layer from falling off the left, the right and rear side perimeter edges of the cot.

8. The cot of claim 7, further comprising: a removable compartment having ends attached to the sidewalls of the cot.

9. The cot of claim 8, further comprising:

a first upside down U-shaped support attached to and extending upward from one side of the cot; and a second upside down U-shaped support attached to and extending upward from another side of the cot opposite the one side, where in the first U-shaped support and the second-shaped support are connected by a strap to stabilize and hold the compartment in a fixed position above the cot.

10. The cot of claim 8, wherein the strap connecting the first U-shaped support and the second U-shaped support is positioned to support the top mid-section of the compartment.

11. The cot of claim 8, further comprising:

a means for fastening the sidewalls to the compartment smoothly and securely.

12. The cot of claim 11 wherein the compartment is irremovably attached to the left sidewall and rear sidewall.

13. The cot of claim 8, wherein the compartment further includes:

lightweight, flexible closely woven fabric for at least one side and openly woven material for at least one side of the enclosure having a total of five sides.

14. The cot of claim 13, wherein the compartment further includes a front cover of openly woven material that is closed with zippers and fasteners to the left and right sidewalls to keep an occupant securely enclosed.

15. The cot of claim 13, wherein the front cover of openly woven material is rolled vertically upward and held in an open, rolled position with fasteners to facilitate access to the interior of the compartment.

16. The cot of claim 1 further comprising:

a removable canopy having ends attached to the corner edges of the cot.

17. The cot of claim 16, further comprising:

a first upside down U-shaped support attached to and extending upward from one side of the cot; and a second upside down U-shaped support attached to and extending upward from another side of the cot opposite the one side, wherein the first U-shaped support and the second U-shaped support hold the canopy in a fixed position above the cot.

18. The cot of claim 1, further comprising:

a length of the assembled cot being approximately 46 inches long and a width of the assembled cot being approximately 24 inches wide.

19. The cot of claim 1, further comprising:

an overall weight of up to approximately 15 pounds.

20. A portable and collapsible cot, comprising:

a flexible planar surface layer; and leg members for both cross-bracing and supporting the planar surface layer over a ground surface, the leg members being moveable between an assembled position and a folded position, where the assembled position is useful to fully support a weighted object being placed on the planar surface layer, and the folded position has the cot in a collapsed position allowing the cot to become portable and easy to carry;

a first pair of straps arranged in a cross pattern attached to front perimeter edges underneath a front portion of the surface layer; and a second pair straps arranged in a crossed pattern attached to rear perimeter edges underneath a rear portion of the surface layer, the second pair of the crossed straps being arranged adjacent to the first pair of the crossed straps, the first and the second pairs of the crossed straps for enhancing strength of the surface layer to support the weighted object thereon.

21. A portable and collapsible cot, comprising:

a flexible planar surface layer; and leg members for both cross-bracing and supporting the planar surface layer over a ground surface, the leg members being moveable between an assembled position and a folded position, where the assembled position is useful to fully supports a weighted object being placed on the planar surface layer, and the folded position has the cot in a collapsed position allowing the cot to become portable and easy to carry; and vertical leg portions extending downward from each of the corners of the planar surface layer having an upper end that remains attached to each of the corners of the planar surface layer, and a bottom end which engages a corner footer when the cot is in the assembled position, and the bottom end disengages the corner footer when the cot is in the folded position; and hendable-snapable members for connecting the bottom ends of the vertical leg portions to the corner footers when the cot is in the assembled position.

* * * * *